US012755374B2

(12) United States Patent
Tokumaru et al.

(10) Patent No.: US 12,755,374 B2
(45) Date of Patent: Oct. 6, 2026

(54) SUBSTRATE INSPECTION METHOD, RECORDING MEDIUM, AND SUBSTRATE INSPECTION DEVICE

(71) Applicant: Tokyo Electron Limited, Tokyo (JP)

(72) Inventors: Tatsuya Tokumaru, Koshi City (JP); Tadashi Nishiyama, Koshi City (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 230 days.

(21) Appl. No.: 18/717,043

(22) PCT Filed: Nov. 28, 2022

(86) PCT No.: PCT/JP2022/043802
§ 371 (c)(1),
(2) Date: Jun. 6, 2024

(87) PCT Pub. No.: WO2023/106157
PCT Pub. Date: Jun. 15, 2023

(65) Prior Publication Data

US 2025/0037267 A1 Jan. 30, 2025

(30) Foreign Application Priority Data

Dec. 10, 2021 (JP) ................................ 2021-200806

(51) Int. Cl.
*G06T 7/00* (2017.01)

(52) U.S. Cl.
CPC .... *G06T 7/001* (2013.01); *G06T 2207/20072* (2013.01); *G06T 2207/20084* (2013.01); *G06T 2207/30148* (2013.01)

(58) Field of Classification Search
CPC ........... G06T 7/001; G06T 2207/20072; G06T 2207/20084; G06T 2207/30148;
(Continued)

(56) References Cited

U.S. PATENT DOCUMENTS

2019/0220972 A1* 7/2019 Iwanaga ............... G06T 7/0004
2019/0287235 A1 9/2019 Ikeda et al.
(Continued)

FOREIGN PATENT DOCUMENTS

CN 110274908 A 9/2019
CN 111937033 A 11/2020
(Continued)

OTHER PUBLICATIONS

International Search Report for PCT/JP2022/043802 dated Jan. 10, 2023.
(Continued)

*Primary Examiner* — Han Hoang
(74) *Attorney, Agent, or Firm* — Chrisman Gallo Tochtrop LLC

(57) ABSTRACT

A substrate inspection method includes acquiring a reference input image based on a captured image of a surface of a reference substrate; acquiring, when the reference input image is inputted into a neural network, reference intermediate information generated in an intermediate layer of the neural network; generating a reference feature image representing a feature of the reference input image based on the reference intermediate information; acquiring an inspection input image based on a captured image of a surface of an inspection target substrate; acquiring inspection intermediate information generated in the intermediate layer when the inspection input image is inputted into the neural network; generating an inspection feature image representing a feature of the inspection input image based on the inspection intermediate information; and determining an abnormality on the surface of the inspection target substrate based on a result of comparing the reference feature image and the inspection feature image.

12 Claims, 16 Drawing Sheets

(58) Field of Classification Search
CPC ......... G06T 2207/20081; G06T 7/0004; G06T 7/00; G01N 21/956; G01N 21/8851; G01N 2021/8854; G01N 2021/8887; G01N 2201/1296
See application file for complete search history.

(56) References Cited

U.S. PATENT DOCUMENTS

| | | | | |
|---|---|---|---|---|
| 2020/0005070 | A1 * | 1/2020 | Ambikapathi | G06F 18/2413 |
| 2020/0410657 | A1 | 12/2020 | Horii et al. | |
| 2022/0100081 | A1 * | 3/2022 | Inose | G03F 1/70 |
| 2022/0309647 | A1 * | 9/2022 | Kizu | G03F 7/7065 |
| 2023/0186458 | A1 * | 6/2023 | Zaima | G06T 9/00<br>382/149 |

FOREIGN PATENT DOCUMENTS

| | | | |
|---|---|---|---|
| JP | 2019-124591 | A | 7/2019 |
| JP | 2021-140739 | A | 9/2021 |
| WO | 2019/131742 | A1 | 7/2019 |
| WO | 2020/246366 | A1 | 12/2020 |

OTHER PUBLICATIONS

Wenyuan, Cui et al. "Metal Additive Manufacturing Parts Inspection Using Convolutional Neural Network". Applied Sciences. 2020, vol. 10, No. 545, pp. 1-15 fig. 3.

* cited by examiner

SUBSTRATE INSPECTION METHOD, RECORDING MEDIUM, AND SUBSTRATE INSPECTION DEVICE

CROSS-REFERENCE TO RELATED APPLICATIONS

This Application is a U.S. national phase application under 35 U.S.C. § 371 of PCT Application No. PCT/JP2022/043802 filed on Nov. 28, 2022, which claims the benefit of Japanese Patent Application No. 2021-200806 filed on Dec. 10, 2021, the entire disclosures of which are incorporated herein by reference.

TECHNICAL FIELD

The various aspects and embodiments described herein pertain generally to a substrate inspection method, a recording medium, and a substrate inspection device.

BACKGROUND

Patent Document 1 discloses a device that classifies defects of a substrate based on a captured image of an inspection target obtained by imaging the substrate.

Patent Document 1: Japanese Patent Laid-open Publication No. 2019-124591

SUMMARY

In an exemplary embodiment, a substrate inspection method includes acquiring a reference input image based on a captured image of a surface of a reference substrate; acquiring, when the reference input image is inputted into a neural network previously constructed to output a recognition result of an image inputted thereto, reference intermediate information generated in an intermediate layer of the neural network; generating a reference feature image representing a feature of the reference input image based on the reference intermediate information; acquiring an inspection input image based on a captured image of a surface of an inspection target substrate; acquiring inspection intermediate information generated in the intermediate layer of the neural network when the inspection input image is inputted into the neural network; generating an inspection feature image representing a feature of the inspection input image based on the inspection intermediate information; and determining presence or absence of an abnormality on the surface of the inspection target substrate based on a result of comparing the reference feature image and the inspection feature image.

DETAILED DESCRIPTION

Figure 1:
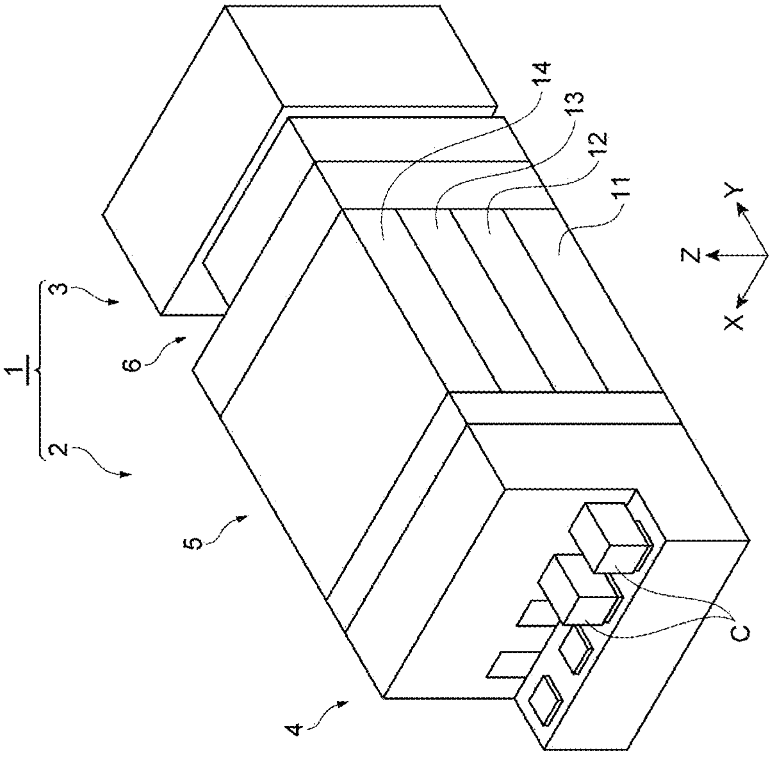
FIG. 1 is a perspective view schematically illustrating a substrate processing system according to a first exemplary embodiment.

Hereinafter, exemplary embodiments will be described with reference to the accompanying drawings. In the description, same parts or parts having same functions will be assigned same reference numerals, and redundant description thereof will be omitted. In some of the drawings, there may be used a rectangular coordinate system defined by the X-axis, the Y-axis and the Z-axis. In the following description, the Z-axis corresponds to a vertical direction, and the X-axis and the Y-axis correspond to horizontal directions.

First Exemplary Embodiment

First, with reference to FIG. 1 to FIG. 11, a substrate processing system according to a first exemplary embodiment will be described. A substrate processing system 1 shown in FIG. 1 is a system configured to perform, on a workpiece W, formation of a photosensitive film, exposure of the photosensitive film, and development of the photosensitive film. The workpiece W as a processing target is, for example, a substrate or a substrate on which a film, a circuit, or the like has been formed by being subjected to a predetermined processing. The substrate included in the workpiece W is, for example, a wafer containing silicon. The workpiece W (substrate) may be formed in a circular shape. The workpiece W as the processing target may be a glass substrate, a mask substrate, a flat panel display (FPD), or the like, or may be an intermediate body obtained by performing a predetermined processing on these substrates. The photosensitive film is, for example, a resist film.

The substrate processing system 1 includes a coating and developing apparatus 2 and an exposure apparatus 3. The exposure apparatus 3 is configured to perform an exposure processing on the resist film (photosensitive film) formed on the workpiece W (substrate). Specifically, the exposure apparatus 3 radiates an energy ray to an exposure target portion of the resist film by such a method as liquid immersion exposure. The coating and developing apparatus 2 is configured to perform a processing of forming the resist film on a surface of the workpiece W before the exposure processing by the exposure apparatus 3, and to perform a developing processing for the resist film after the exposure processing.

[Substrate Processing Apparatus]

Figure 2:
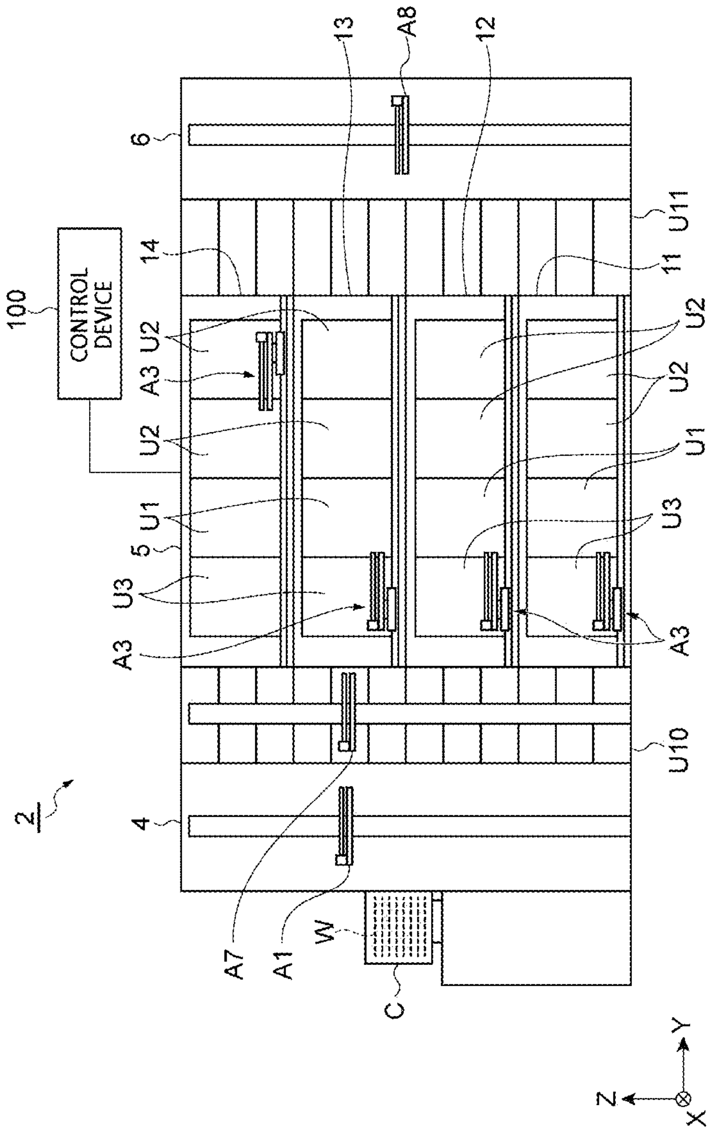
FIG. 2 is a side view schematically illustrating an example of a coating and developing apparatus.

Hereinafter, a configuration of the coating and developing apparatus 2 will be described as an example of a substrate processing apparatus. As shown in FIG. 1 and FIG. 2, the coating and developing apparatus 2 includes a carrier block 4, a processing block 5, an interface block 6, and a control device 100.

The carrier block 4 is configured to perform a carry-in and a carry-out of the workpiece W into/from the coating and developing apparatus 2. For example, the carrier block 4 is configured to support a plurality of carriers C (accommodation parts) for the workpiece W, and has therein a transfer device A1 including a delivery arm. Each carrier C accommodates therein, for example, a plurality of circular workpieces W. The transfer device A1 is configured to take out the workpiece W from the carrier C, hand the workpiece W over to the processing block 5, receive the workpiece W from the processing block 5, and return the workpiece W back into the carrier C. The processing block 5 has a plurality of processing modules 11, 12, 13, and 14.

The processing module 11 incorporates therein a liquid processing device U1, a heat treatment device U2, an inspection device U3, and a transfer device A3 configured to transfer the workpiece W to these devices. The processing module 11 is configured to form a bottom film on the surface of the workpiece W by the liquid processing device U1 and the heat treatment device U2. The liquid processing device U1 of the processing module 11 is configured to coat a processing liquid for forming the bottom film on the workpiece W. The heat treatment device U2 of the processing module 11 is configured to perform various kinds of heat treatments required to form the bottom film. The inspection device U3 is configured to perform a processing for inspecting a surface state of the workpiece W before or after the bottom film is formed, or before the processing liquid for forming the bottom film is coated and the heat treatments are performed.

The processing module 12 incorporates therein a liquid processing device U1, a heat treatment device U2, an inspection device U3, and a transfer device A3 configured to transfer the workpiece W to these units. The processing module 12 is configured to form a resist film on the bottom film by the liquid processing device U1 and the heat treatment device U2. The liquid processing device U1 of the processing module 12 is configured to coat, on the bottom film, a processing liquid (resist) for forming the resist film. The heat treatment device U2 of the processing module 12 is configured to perform various kinds of heat treatments required to form the resist film. The inspection device U3 is configured to perform a processing for inspecting the surface state of the workpiece W before or after the resist film is formed, or before the resist is coated and the heat treatments are performed.

The processing module 13 incorporates therein a liquid processing device U1, a heat treatment device U2, an inspection device U3, and a transfer device A3 configured to transfer the workpiece W to these units. The processing module 13 is configured to form a top film on the resist film by the liquid processing device U1 and the heat treatment device U2. The liquid processing device U1 of the processing module 13 is configured to coat, on the resist film, a processing liquid for forming the top film. The heat treatment device U2 of the processing module 13 is configured to perform various kinds of heat treatments required to form the top film. The inspection device U3 is configured to perform a processing for inspecting the surface state of the workpiece W before or after the top film is formed, or before the processing liquid for forming the top film is coated and the heat treatments are performed.

The processing module 14 incorporates therein a liquid processing device U1, a heat treatment device U2, an inspection device U3, and a transfer device A3 configured to transfer the workpiece W to these units. The processing module 14 is configured to perform a developing processing for the resist film after being subjected to the exposure by the liquid processing device U1 and the heat treatment device U2. The liquid processing device U1 of the processing module 14 is configured to perform the developing processing for the resist film by supplying a developing liquid onto the surface of the workpiece W after being subjected to the exposure and then by washing away the developing liquid with a rinse liquid.

The heat treatment device U2 of the processing module 14 is configured to perform various kinds of heat treatments required for the developing processing. Specific examples of these heat treatments include a heat treatment before development (PEB: Post Exposure Bake), a heat treatment after development (PB: Post Bake), etc. The inspection device U3 is configured to perform a processing for inspecting the surface state of the workpiece W before the developing processing and the PEB are performed, after the developing processing and the PB are performed, or before the developing liquid is supplied and the PB is performed.

Within the processing block 5, a shelf section U10 is provided near the carrier block 4. The shelf section U10 is partitioned into a multiple number of cells arranged in a vertical direction. A transfer device A7 including an elevating arm is provided near the shelf section 10. The transfer device A7 is configured to move the wafer W up and down between the cells of the shelf section U10.

Within the processing block 5, a shelf section U11 is provided near the interface block 6. The shelf section U11 is partitioned into a multiple number of cells arranged in the vertical direction.

The interface block 6 is configured to deliver the workpiece W to/from the exposure apparatus 3. By way of example, the interface block 6 incorporates therein a transfer device A8 including a delivery arm, and is connected to the exposure apparatus 3. The transfer device A8 is configured to hand the workpiece W placed in the shelf section U11 over to the exposure apparatus 3, receive the workpiece W from the exposure apparatus 3, and return the workpiece W back into the shelf section U11.

The control device 100 controls the individual devices included in the coating and developing apparatus 2 to perform a coating and developing processing (substrate processing) in the following sequence, for example. First, the control device 100 controls the transfer device A1 to transfer the workpiece W within the carrier C into the shelf section U10, and controls the transfer device A7 to place this workpiece W in the cell for the processing module 11.

Subsequently, the control device 100 controls the transfer device A3 to transfer the workpiece W of the shelf section U10 to the liquid processing device U1 within the processing module 11. The control device 100 controls the liquid processing device U1 to form a film of a processing liquid for forming a bottom film on the surface of the workpiece W. The control device 100 controls the heat treatment device U2 to heat the workpiece W on which the film of the processing liquid for forming the bottom film has been formed, to thereby form the bottom film. Thereafter, the control device 100 controls the transfer device A3 to return the workpiece W having the bottom film formed thereon into the shelf section U10, and controls the transfer device A7 to place this workpiece W in the cell for the processing module 12. The control device 100 may control the inspection device U3 to inspect the surface of the workpiece W at a certain timing while the processings in the processing module 11 are being performed.

Next, the control device 100 controls the transfer device A3 to transfer the workpiece W of the shelf section U10 to the liquid processing device U1 within the processing module 12. The control device 100 controls the liquid processing device U1 to form a film of a processing liquid for forming a resist film on the surface of the workpiece W. The control device 100 controls the heat treatment device U2 to heat the workpiece W on which the film of the processing liquid for forming the resist film has been formed, to thereby form the resist film. Thereafter, the control device 100 controls the transfer device A3 to return the workpiece W to the shelf section U10, and controls the transfer device A7 to place this workpiece W in the cell for the processing module 13. The control device 100 may control the inspection device U3 to inspect the surface of the workpiece W at a certain timing while the processings in the processing module 12 are being performed.

Subsequently, the control device 100 controls the transfer device A3 to transfer the workpiece W of the shelf section U10 to the liquid processing device U1 within the processing module 13. Further, the control device 100 controls the liquid processing device U1 to form a film of a processing liquid for forming a top film on the resist film of the workpiece W. The control device 100 controls the heat treatment device U2 to heat the workpiece W on which the film of the processing liquid for forming the top film has been formed, to thereby form the top film. Afterwards, the control device 100 controls the transfer device A3 to transfer the workpiece W to the shelf section U11. The control device 100 may control the inspection device U3 to inspect the surface of the workpiece W at a certain timing while the processings in the processing module 13 are being performed.

Next, the control device 100 controls the transfer device A8 to send the workpiece W of the shelf section U11 to the exposure apparatus 3. Thereafter, the control device 100 controls the transfer device A8 to receive the workpiece W after being subjected to an exposure processing from the exposure apparatus 3 and place the received workpiece W in the cell for the processing module 14 in the shelf section U11.

Then, the control device 100 controls the transfer device A3 to transfer the workpiece W of the shelf section U11 to the individual devices in the processing module 14, and controls the liquid processing device U1 and the heat treatment device U2 to perform a developing processing for the resist film of the workpiece W. Thereafter, the control device 100 controls the transfer device A3 to return the workpiece W to the shelf section U10, and controls the transfer device A7 and the transfer device A1 to return the workpiece W back into the carrier C. The control device 100 may control the inspection device U3 to inspect the surface of the workpiece W at a certain timing while the processings in the processing module 14 are being performed. In this way, the coating and developing processing for the single sheet of workpiece W is completed. The control device 100 controls the individual devices of the coating and developing apparatus 2 to perform the coating and developing processing for each of a plurality of subsequent workpieces W in the same manner as described above.

A specific configuration of the substrate processing apparatus is not limited to the configuration of the coating and developing apparatus 2 described above as an example. The substrate processing apparatus may have any configuration as long as it is equipped with a device configured to inspect the surface of the workpiece W on which a preset processing is to be performed as well as a control device configured to control this device.

(Inspection Device)

Figure 3:
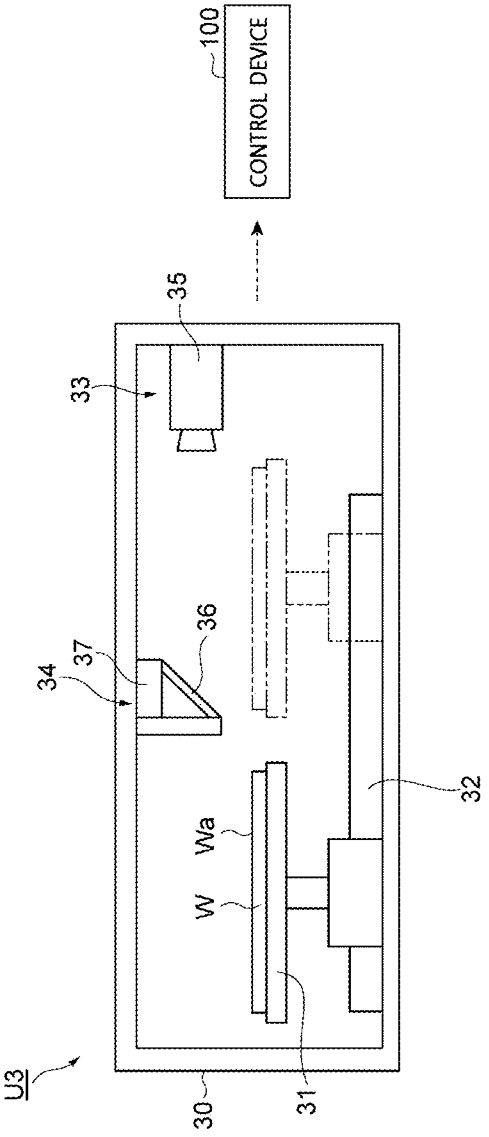
FIG. 3 is a schematic diagram illustrating an example of an inspection device.

Now, the inspection device U3 included in the processing modules 11 to 14 will be explained. The inspection device U3 has a function of acquiring image data by imaging the surface (hereinafter referred to as "surface Wa") of the workpiece W. The inspection device U3 may acquire the image data of the entire surface Wa of the workpiece W by imaging the entire surface Wa. As shown in FIG. 3, the inspection device U3 includes, by way of example, a housing 30, a holder 31, a linear driver 32, an imaging device 33, and a light transmitting/reflecting device 34.

The holder 31 is configured to hold the workpiece W horizontally with the surface Wa facing upwards. The linear driver 32 includes a power source such as, but not limited to, an electric motor, and is configured to move the holder 31 along a horizontal linear path. The imaging device 33 has a camera 35 such as, but not limited to, a CCD camera. Within the inspection device U3, the camera 35 is provided near one end of the inspection device U3 in a moving direction of the holder 31, and is directed toward the other end of the inspection device U3 in that moving direction. The light transmitting/reflecting device 34 is configured to transmit light to an imaging range and guide reflected light from the imaging range to the camera 35. For example, the light transmitting/reflecting device 34 has a half mirror 36 and a light source 37. The half mirror 36 is located at a higher position than the holder 31 and is provided at a midway position of a movement range of the linear driver 32, and is configured to reflect light from below toward the camera 35. The light source 37 is disposed above the half mirror 36, and is configured to radiate illumination light downwards through the half mirror 36.

The inspection device U3 operates as follows to acquire the image data of the surface Wa of the workpiece W. First, the linear driver 32 moves the holder 31. Accordingly, the workpiece W passes a space under the half mirror 36. In this passing process, reflected lights from individual portions of the surface Wa of the workpiece W are sequentially sent to the camera 35. The camera 35 focuses the reflected lights from the individual portions of the surface Wa of the workpiece W to acquire the image data of the surface Wa (entire surface Wa) of the workpiece W. This captured image obtained by imaging the surface Wa of the workpiece W changes depending on the state of the surface Wa of the workpiece W. That is, acquiring the captured image (captured image data) of the surface Wa of the workpiece W corresponds to acquiring information indicating the state of the surface Wa of the workpiece W.

The captured image data acquired by the camera 35 is sent to the control device 100. In the control device 100, the state of the surface Wa of the workpiece W can be inspected based on the captured image data of the surface Wa. For example, presence or absence of a defect on the surface Wa of the workpiece W may be inspected. In the present disclosure, image data in which a pixel value for each pixel is defined may sometimes be simply referred to as "image."

[Control Device]

Figure 4:
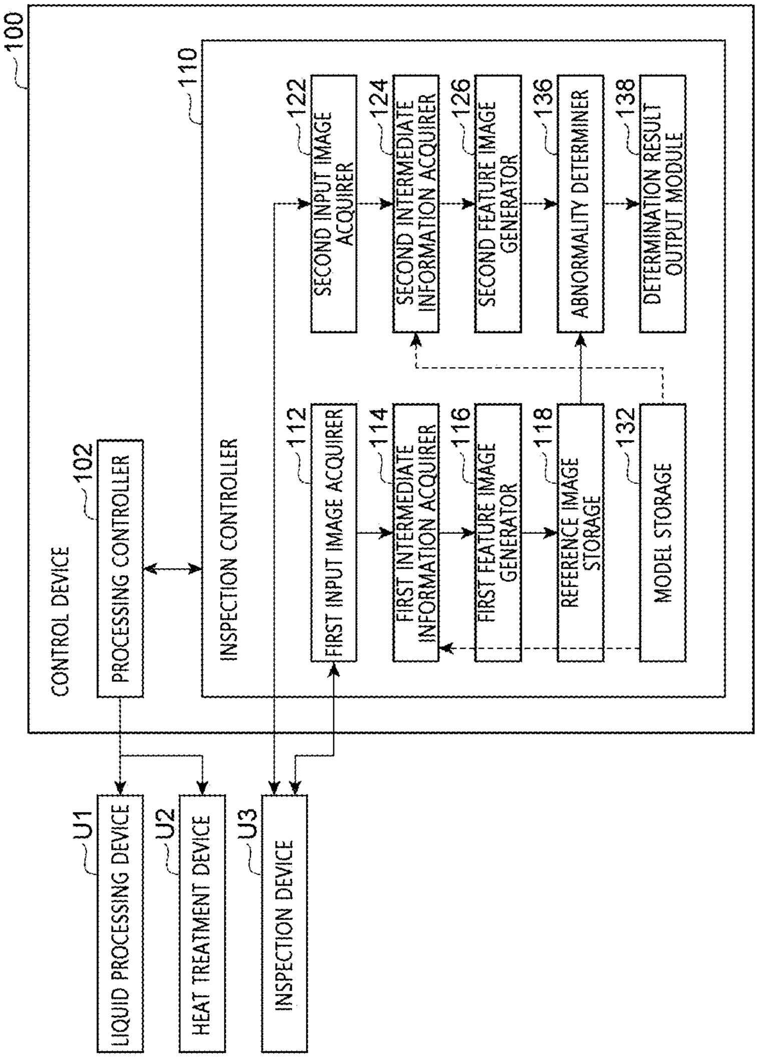
FIG. 4 is a block diagram illustrating an example of a functional configuration of a control device.
Figure 5:
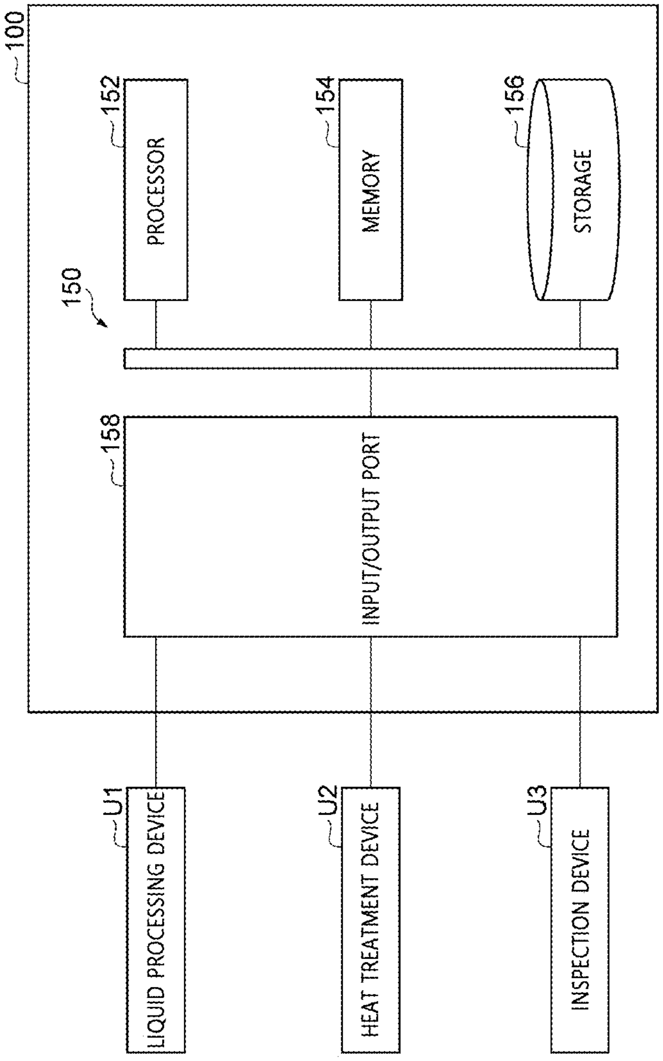
FIG. 5 is a block diagram illustrating an example of a hardware configuration of the control device.

As shown in FIG. 4, the control device 100 has a processing controller 102 and an inspection controller 110 as functional components (hereinafter referred to as "functional modules"). A processing performed by the processing controller 102 and the inspection controller 110 corresponds to a processing performed by the control device 100. The processing controller 102 controls the liquid processing device U1 and the heat treatment device U2 to perform the liquid processings and the heat treatments in the above-described coating and developing processing on the workpiece W.

The inspection controller 110 (substrate inspection device) inspects the workpiece W based on the image data obtained from the inspection device U3 in any one of the stages when the coating and developing processing is performed. The inspection of the workpiece W includes determining presence or absence of an abnormality (defect) on the surface Wa of the workpiece W. The defect on the surface Wa may include, by way of non-limiting example, a flaw (scratch), adhesion of a foreign substance, non-uniform coating of the processing liquid, non-coating of the processing liquid, and so forth.

Before performing the inspection, the inspection controller 110 prepares reference data to be used in an inspection from a reference workpiece W (reference substrate). The inspection controller 110 performs an inspection of an inspection target workpiece W (inspection target substrate) based on the reference data. The reference workpiece W and the inspection target workpiece W are the same type of workpieces (substrates). The coating and developing processing is performed on the reference workpiece W and the inspection target workpiece W under the same processing conditions, and the preparation of the reference data and the inspection of workpiece W are performed at the same timing in the coating and developing processing (for example, after coating of the resist and before the heat treatment).

The inspection controller 110 includes, as functional modules, a first input image acquirer 112, a first intermediate information acquirer 114, a first feature image generator 116, a reference image storage 118, a model storage 132, a second input image acquirer 122, a second intermediate information acquirer 124, a second feature image generator 126, an abnormality determiner 136, and a determination result output module 138. A processing performed by each functional module of the inspection controller 110 corresponds to a processing performed by the inspection controller 110 (control device 100).

The first input image acquirer 112 is configured to acquire a reference input image based on the captured image of the reference workpiece W. The first intermediate information acquirer 114 is configured to acquire reference intermediate information generated in an intermediate layer of a neural network (hereinafter referred to as "image recognition model M") constructed in advance to output a recognition result of an inputted image when the reference input image is inputted into the image recognition model M. The first feature image generator 116 generates a reference feature image representing features of the reference input image based on the reference intermediate information.

The reference image storage 118 stores (remembers) therein the reference feature image generated by the first feature image generator 116. The reference feature image generated by the first feature image generator 116 is the reference data to be used in the inspection of the inspection target workpiece W. The model storage 132 stores therein the aforementioned image recognition model M.

The second input image acquirer 122 is configured to acquire an inspection input image based on the captured image of the surface Wa of the inspection target workpiece W. The second intermediate information acquirer 124 is configured to acquire inspection intermediate information generated in the intermediate layer of the image recognition model M when the inspection input image is inputted into the image recognition model M. The second feature image generator 126 is configured to generate an inspection feature image representing features of the inspection input image based on the inspection intermediate information.

The abnormality determiner 136 is configured to determine presence or absence of an abnormality on the surface Wa of the inspection target workpiece W based on a result of comparing the reference feature image and the inspection feature image. The determination result output module 138 is configured to output a determination result from the abnormality determiner 136. When it is determined by the abnormality determiner 136 that there is an abnormality on the surface Wa of the workpiece W, the determination result output module 138 outputs an abnormality signal indicating that the inspection target workpiece W is abnormal. The determination result output module 138 may output the abnormality signal to the processing controller 102, a higher-level controller, or an output device such as a monitor for notifying the information to an operator or the like.

The control device 100 is comprised of one or more computers. The control device 100 has, for example, a circuit 150 shown in FIG. 5. The circuit 150 has one or more processors 152, a memory 154, a storage 156, and an input/output port 158. The storage 156 has a computer-readable recording medium such as, but not limited to, a hard disk. The recording medium stores therein a program (substrate inspection program) for causing the control device 100 to implement a substrate inspection method to be described later. The recording medium may be a removable medium such as a non-volatile semiconductor memory, a magnetic disk, or an optical disk.

The memory 154 temporarily stores therein the program loaded from the recording medium of the storage 156 and an operation result from the processor 152. The processor 152 executes the program in cooperation with the memory 154, thereby embodying each of the above-described functional modules. The input/output port 158 performs an input/output of an electrical signal to/from the liquid processing device U1, the heat treatment device U2, and the inspection device U3 in response to an instruction from the processor 152.

Additionally, the hardware configuration of the control device 100 is not necessarily limited to embodying each functional module by the program. For example, each of the functional modules of the control device 100 may be implemented by a dedicated logic circuit or an ASIC (Application Specific Integrated Circuit) integrating logic circuits. When the control device 100 is composed of multiple computers (multiple circuits), some of the above-described functional modules may be implemented by one computer (circuit), and the rest of the functional modules may be implemented by the other computer (circuit).

[Substrate Inspection Method]

Figure 6:
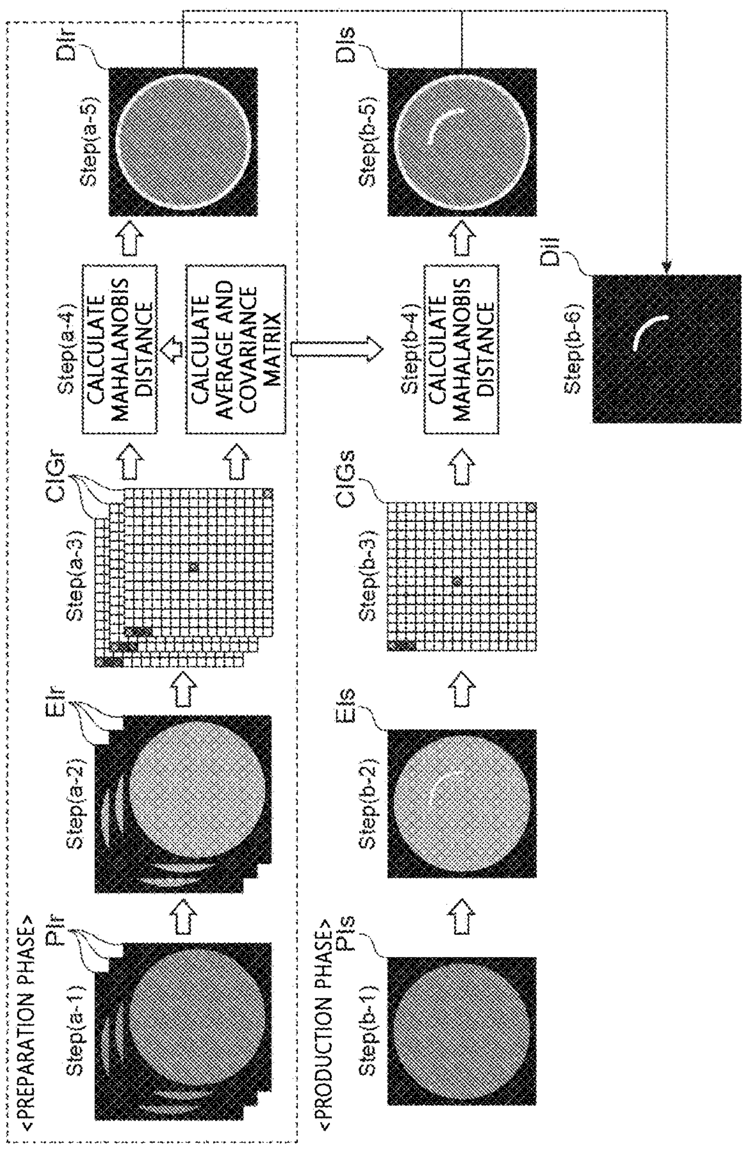
FIG. 6 is a schematic diagram illustrating an example of a substrate inspection method.

Now, as an example of the substrate inspection method, a series of processings performed by the control device 100 (inspection controller 110) will be described. The control device 100 performs a processing in a preparation phase and a processing in a production phase, as shown in FIG. 6, for example. In the preparation phase, the control device 100 performs a coating and developing processing on a reference workpiece W, and then prepares for an inspection on a workpiece W in the production phase. In the production phase, the control device 100 sequentially performs the coating and developing processing on a plurality of workpieces W, and then inspects each workpiece W on which the coating and developing processing has been performed. The workpiece W inspected in the production phase corresponds to the above-described inspection target workpiece W.

<Preparation Phase>

Figure 7:
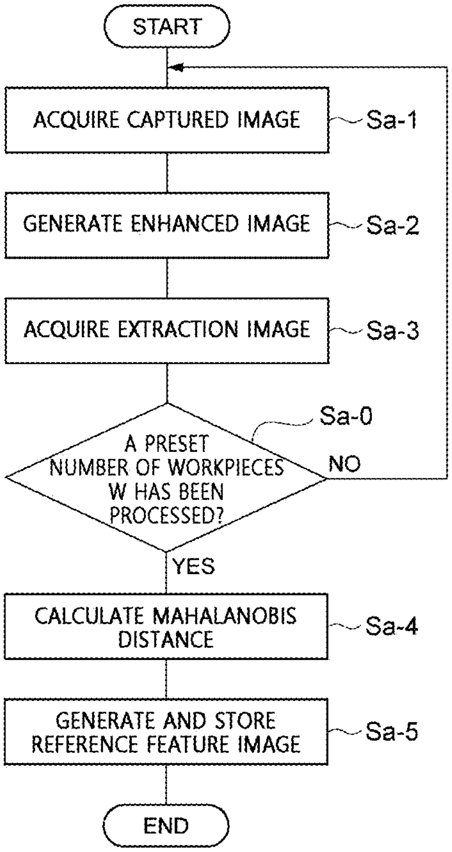
FIG. 7 is a flowchart illustrating an example of an inspection processing in a preparation phase.

FIG. 7 is a flowchart showing a series of processings in the preparation phase shown in FIG. 6. The series of processings shown in FIG. 7 are started in the state that the reference workpiece W, which has been subjected to the processing before the inspection in the coating and developing processing and is determined to have been normally processed, is transferred to the inspection device U3.

The control device 100 first performs a process Sa-1. For example, in the process Sa-1, the first input image acquirer 112 of the inspection controller 110 images the surface Wa of the reference workpiece W by the inspect device U3, thus acquiring a captured image PIr of the surface Wa of the reference workpiece W. The captured image PIr may be a color image. The captured image PIr may include the entire surface Wa, and the number of pixels in a horizontal direction and the number of pixels in a vertical direction in the captured image PIr may be the same.

Then, the control device 100 performs a process Sa-2. For example, in the process Sa-2, the first input image acquirer 112 performs a contrast-enhancing processing on the captured image PIr obtained in the process Sa-1 to produce an enhanced image EIr. By performing the contrast-enhancing processing, a difference (difference in luminance) between a bright portion and a dark portion of the image is enhanced, for example. The first input image acquirer 112 may perform the contrast-enhancing processing by employing various methods. The first input image acquirer 112 may perform the contrast-enhancing processing on the captured image PIr by transforming (adjusting) a tone curve. Alternatively, the first input image acquirer 112 may perform the contrast-enhancing processing by applying a commonly known spatial filter to the captured image PIr.

Thereafter, the control device 100 performs a process Sa-3. For example, in the process Sa-3, the first intermediate information acquirer 114 acquires reference intermediate information generated in the intermediate layer of the aforementioned image recognition model M when the enhanced image EIr (reference input image) obtained in the process Sa-2 is inputted into the image recognition model M. For example, the first intermediate information acquirer 114 acquires, as the reference intermediate information, an extraction image group CIGr including a plurality of extraction images CIr (multiple reference extraction images) generated in the intermediate layer of the image recognition model M based on the enhanced image EIr and a plurality of filters that extract different features.

Here, the image recognition model M used in the process Sa-3 will be explained. The image recognition model M is a model constructed in advance through machine learning to output a result (recognition result) of classifying the contents contained in an image into categories when the image is inputted. The image recognition model M may be a multi-layer neural network constructed by deep learning. The image recognition model M may be a convolutional neural network (CNN).

The image recognition model M may not need to be a model constructed to classify the workpiece W in the image into categories according to specified conditions. The image recognition model M may be a model that recognizes the type of an object (for example, animal, fruit, etc.), a model that recognizes a human face, or a model that recognizes characters. The CNN may be composed of an input layer, a multiple number of convolution layers, a pooling layer, a fully-connected layer, and an output layer.

In the convolution layer (intermediate layer) included in the image recognition model M, a plurality of filters are used, and convolution is performed on an input image inputted into that layer. A filter is also called a kernel, and each file is grid-shaped numerical data representing a specific shape (feature). The size of the filter is smaller than the size of the input image. The plurality of filters are set such that different shapes (features) are obtained in the convolution layer. In a convolution calculation for an input image using one file, there is performed a conversion processing in which a product is calculated for each pixel between the filter and a partial image (window) of the same size as the filter in the input image, for example, and a total sum of the calculation results of the products of all pixels is calculated. Then, this conversion processing is repeated for the entire input image while moving the position of the partial image by a preset number of pixels.

By repeating the conversion processing, an image in which the shape set by the filter is extracted (responsive to the shape) is obtained as a convolution result. The convolution result is referred to as a feature map. The plurality of extraction images CIr acquired by the first intermediate information acquirer 114 are multiple images obtained by performing convolution through the use of N filters in any one of the multiple number of convolution layers. N is a natural number equal to or larger than 2. The first intermediate information acquirer 114 may input the enhanced image EIr obtained in the process Sa-2 into the image recognition model M stored in the model storage 132, and then acquire the plurality of extraction images CIr from an intermediate calculation result by the image recognition model M.

Figure 8:
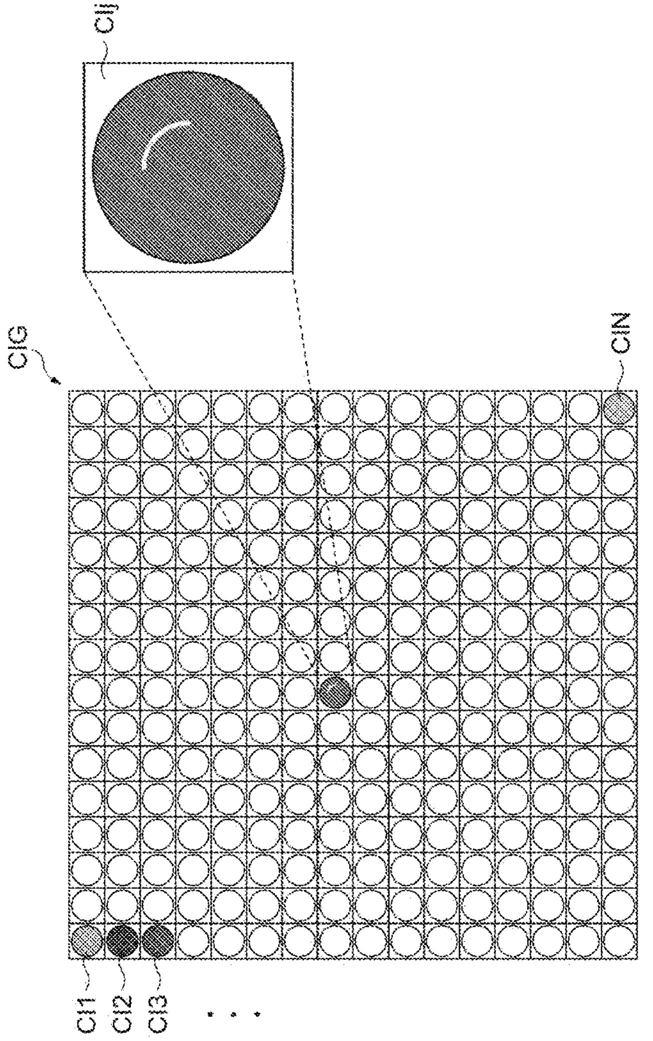
FIG. 8 is a diagram schematically illustrating an example of an extraction image extracted from an intermediate layer.

FIG. 8 schematically illustrates an extraction image group CIG obtained by inputting the captured image of the surface Wa of the workpiece W into the image recognition model M and performing convolution by using N filters in any one of the multiple number of convolution layers. The extraction image group CIG includes a plurality of extraction images CI. The plurality of extraction images CI obtained when the input image into the image recognition model M is the enhanced image EIr correspond to the plurality of extraction images CIr mentioned above. The plurality of extraction images CI include extraction images CI1, CI2, . . . , CIN. Here, N ranges from, e.g., 230 to 270. The following description will be provided for an example case where the number of pixels in the vertical direction is 255 and the number of pixels in the horizontal direction is 255 in a single extraction image CI. The plurality of extraction images CI may be gray scale images. When a color image is inputted, the image recognition model M may convert the color image to a gray scale and then perform an operation. Further, in FIG. 8, extraction images other than the extraction images CI1, CI2, CI3, CIj, and CIN are simply illustrated as circles, but these extraction images also have pixel values.

Referring back to FIG. 6 and FIG. 7, the control device 100 performs a process Sa-0 upon the completion of the process Sa-3. For example, in the process Sa-0, the control device 100 determines whether or not the series of processings of processes Sa-1 to Sa-3 have been performed on a preset number of reference workpieces W. The preset number is set to, for example, a number sufficient to resolve individual differences between the reference workpieces W. When it is determined that the series of processings have not been performed for the preset number of reference workpieces W (process Sa-0: NO), the processing performed by the control device 100 returns to the process Sa-1. Then, the control device 100 performs the series of processings of processes Sa-1 to Sa-3 on other reference workpieces W.

When it is determined in the process Sa-0 that the series of processings have been performed for the preset number of reference workpieces W (process Sa-0: YES), the processing performed by the control device 100 proceeds to a process Sa-4. For example, in the process Sa-4, the first feature image generator 116 performs an operation for generating a reference feature image DIr based on the plurality of extraction images CIr acquired in the process Sa-3. For sequence data of a pixel value (luminance value) of each pixel included in the plurality of extraction images CIr, the first feature image generator 116 calculates a Mahalanobis distance (reference Mahalanobis distance) based on a data distribution of the plurality of extraction images CIr. The first feature image generator 116 may calculate the Mahalanobis distance for each of the plurality of reference workpieces W (for each reference workpiece W).

Here, an example of a method of calculating the Mahalanobis distance and a method of generating the reference feature image DIr will be described with reference to FIG. 9 and FIG. 10. In the following, an ordinate on an image is denoted as 'i', and an abscissa is denoted as 'j'. Pixel (i, j) represents a pixel located in the $i^{th}$ row and $j^{th}$ column, and each of i and j is a natural number ranging from 1 to N. First, sequence data of pixel values is created for extraction images CIr1, CIr2, . . . , and CIrN (multiple extraction images) obtained from the first reference workpiece W. The pixel values of all the pixels included in the extraction image CIr1 can be expressed as one column of vertically arranged sequence data. Pixel values included in each of the extraction images CIr2, . . . , and CIrN can also be expressed as one column of vertically arranged sequence data. The number of the data in one column of sequence data obtained from the one reference workpiece W and arranged vertically is, for example, 255×255=65025.

Next, sequence data of pixel values is created for extraction images CIr1, CIr2, . . . , and CIrN obtained from the second reference workpiece W, and the obtained sequence data is arranged under the sequence data of the first reference workpiece W. For the third and subsequent reference workpieces W as well, sequence data of pixel values are created, and the created sequence data are sequentially arranged under the sequence data already created. In this case, assuming that the number of the reference workpieces W is A (A is a natural number equal to or larger than 2), the number of data in one column of vertically arranged sequence data is, for example, 65025×A.

Figure 9:
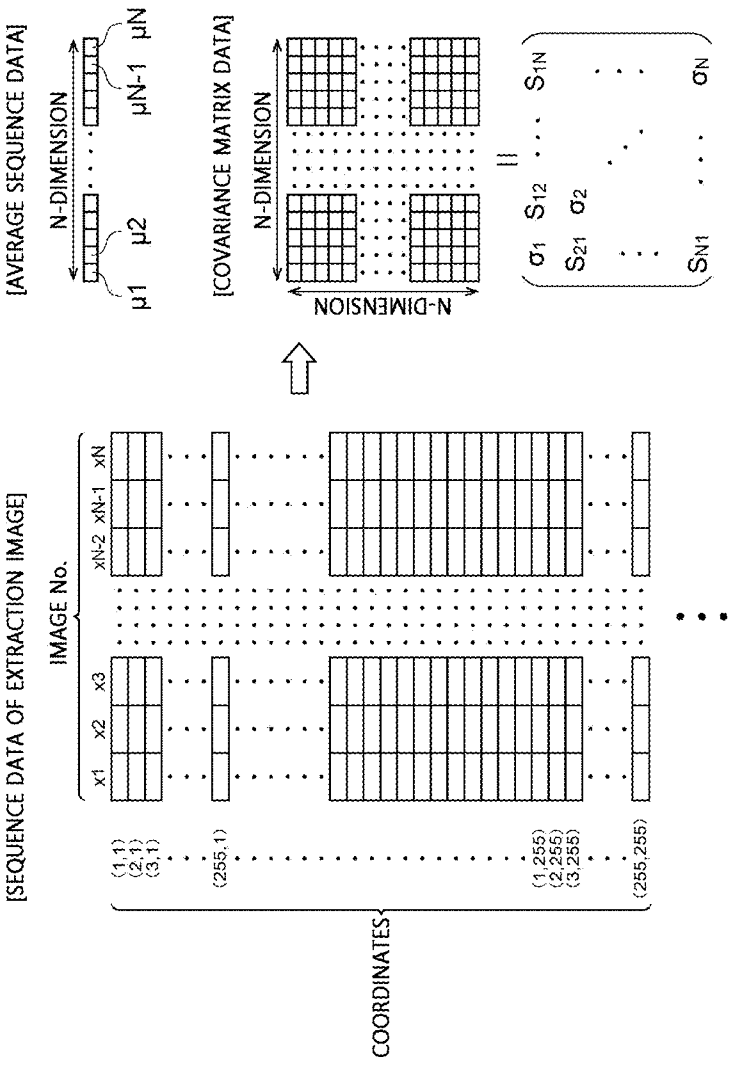
FIG. 9 is a diagram for explaining an example of a process of calculating a Mahalanobis distance.
Figure 10:
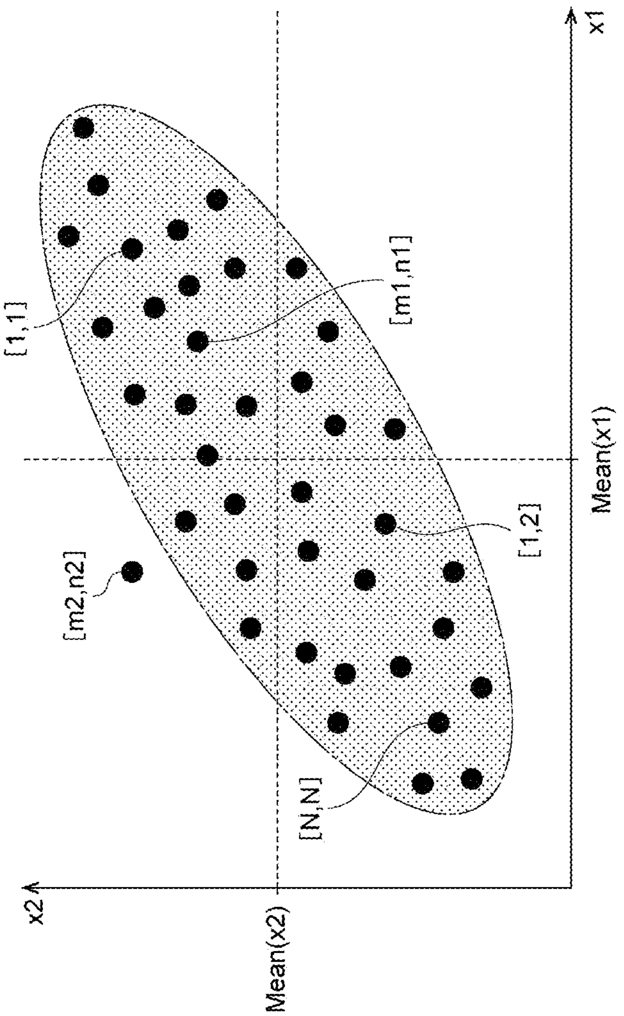
FIG. 10 presents a graph for conceptually explaining an example of the Mahalanobis distance.

In FIG. 9, the pixel values of all the pixels in the extraction image CIr1 obtained from each of the plurality of reference workpieces W are illustrated as sequence data arranged vertically as variable×1. The pixel values of all the pixels in the extraction image CIr2 obtained from each of the plurality of reference workpieces W are illustrated as sequence data arranged vertically as variable×2. Likewise, the pixel values of all the pixels in each of the extraction images CIr3 to CIrN-1 obtained from each of the plurality of reference workpieces W are illustrated as sequence data arranged vertically as variable×3 to variable×N−1, respectively. The pixel values of all the pixels in the extraction image CIrN obtained from each of the plurality of reference workpieces W are expressed as sequence data arranged vertically as variable×N. The N sequence data expressed as the variable×1 to variable×N are arranged in order in a horizontal direction. The N sequence data expressed as the variable×1 to variable×N contains N variables, so it is N-dimensional data.

In each sequence data arranged vertically, the order in which coordinates are arranged is the same. For this reason, in the plurality of sequence data arranged in the horizontal direction, pixel values of pixels (i, j) of the same coordinates in variable×1 to variable×N are arranged in the horizontal direction. For example, regarding the first reference workpiece W, the pixel value of variable×1 in pixel (1, 1), the pixel value of variable×2 in pixel (1, 1), and the pixel values of variables×3 to ×N in pixel (1, 1) are arranged in the first row of the sequence data in FIG. 9. Here, any variable among the variables×1 to ×N is denoted as 'xn', and n represents a natural number ranging from 1 to N. The pixel value of the pixel (i, j) of specific coordinates in the variable×n is expressed as '×n[i, j]'. Further, ×1 [i, j], ×2 [i, j], . . . , and ×N [i, j] are sequence data that are arranged in the horizontal direction in this order. As stated above, the first feature image generator 116 performs, for the plurality of reference workpieces W, the processing of arranging the values (pixel values) included in each of the plurality of extraction images CIr in a vertical direction.

Subsequently, the first feature image generator 116 calculates average sequence data indicating an average for each variable and a covariance matrix in order to calculate a Mahalanobis distance. FIG. 10 shows a graph for explaining the concept of the Mahalanobis distance. Here, in order to simplify the explanation, the concept of the Mahalanobis distance obtained from one reference workpiece W and calculated from two-dimensional sequence data containing only the variable×1 and variable×2 will be explained. In the graph shown in FIG. 10, a horizontal axis represents variable×1, and a vertical axis represents variable×2. In the graph of FIG. 10, values (×1 [i, j], ×2 [i, j]) of combinations of variable×1 and variable×2 are plotted for each pixel (coordinates).

Between the values of combinations of pixel values represented by [m1, n1] and the values of combinations of pixel values represented by [m2, n2], distances from the values of combinations of Mean (×1), which is the average value of variable×1, and Mean (×2), which is the average value of variable×2, are approximately equal. Here, m1, m2, n1 and n2 denote a natural number ranging from 1 to N. However, the values of the combinations of the pixel values represented by [m2, n2] deviate from the distribution of the values of the combinations of variable×1 and variable×2, as compared to the values of the combinations of the pixel values represented by [m1, n1]. A Mahalanobis distance can represent the degree of deviation (abnormality) from the data distribution of variable×1 and variable×2.

The first feature image generator 116 calculates an average un of the pixel values for each variable xn (for each of the variables×1 to ×N) to thereby obtain an average sequence data (averages) shown in FIG. 9. The average un is calculated from the vertically arranged sequence data of one column included in the variable xn, and is an arithmetic mean of the pixel values of all the pixels for all the workpieces W in that column. For each variable xn (for each of the variables×1 to ×N), the first feature image generator 116 calculates a variance on from the sequence data in which the pixel values are vertically arranged. The first feature image generator 116 calculates a correlation coefficient Srs (covariance) for each of all combinations of two variables among the variables×1 to ×N. Each of r and s in the correlation coefficient Srs is a natural number ranging from 1 to N, satisfying a condition of r #s. By calculating the variance on and the correlation coefficient Srs, a covariance matrix is obtained.

By using the average sequence data and the covariance matrix, the first feature image generator 116 calculates a Mahalanobis distance for the horizontally arranged sequence data of the pixel values of each pixel (i, j) in the variables×1 to ×N regarding one reference workpiece W. The first feature image generator 116 calculates the Mahalanobis distance from the sequence data of the pixel values of each pixel of the one reference workpiece W. In this case, for all the pixels, one Mahalanobis distance is calculated for one pixel. Here, the Mahalanobis distance in the pixel (i, j) is denoted as 'distance (MD) (i, j)', and a set of distances (MD) (i, J) in all the pixels is defined as 'MD data'.

The first feature image generator 116 also calculates the Mahalanobis distance for all pixels of other (second and subsequent) reference workpieces W from the sequence data of the pixel values of each pixel in the same way as described above. As a result, a plurality of MD data are generated for the plurality of reference workpieces W. In the present disclosure, calculating the Mahalanobis distance for one reference workpiece W based on the data distribution of the plurality of extraction images CIr obtained from that workpiece W includes calculation using the averages and the covariance matrix obtained by using the data acquired from the reference workpieces W other than the one workpiece W.

Referring back to FIG. 6 and FIG. 7, the control device 100 then performs a process Sa-5. For example, in the process Sa-5, the first feature image generator 116 generates a reference feature image DIr from the plurality of MD data obtained in the process Sa-4. The first feature image generator 116 calculates, for each pixel (i, j), a value (pixel value) of that pixel in the reference feature image DIr based on the plurality of distances (MD) (i, j) included in the plurality of MD data. The first feature image generator 116 may calculate, for each pixel (i, j), a maximum or an average value of the plurality of distances (MD) (i, j) as the pixel value in the reference feature image DIr.

After calculating the pixel values of the reference feature image DIr for all the pixels (i, j), the reference image storage 118 stores therein the reference feature image DIr. Through the above-described operations, the series of processings in the preparation phase are completed, and the reference feature image DIr, which is reference data used for an inspection in the production phase, is generated. In the series of processings exemplified above, one reference feature image DIr is obtained from the plurality of enhanced images EIr obtained for at least two reference workpieces W. In addition, one reference feature image DIr may be obtained from the enhanced image EIr of one reference workpiece W instead of two or more reference workpieces W. Instead of calculating the averages and the covariance matrix from the sequence data obtained from all the reference workpieces W, the averages and the covariance matrix may be calculated for each reference workpiece W to calculate the Mahalanobis distance.

When the two reference workpieces W used to generate the reference feature image DIr are referred to as 'reference workpiece Wr1' and 'reference workpiece Wr2', the individual functional modules of the inspection controller 110 performs the following processings. The first input image acquirer 112 acquires an enhanced image EIr1 based on a captured image of the surface Wa of the reference workpiece Wr1, and acquires an enhanced image EIr2 (second reference input image) based on a captured image of the surface Wa of the reference workpiece Wr2 (second reference substrate). The first intermediate information acquirer 114 acquires first intermediate information generated in the intermediate layer of the image recognition model M when the enhanced image EIr1 is inputted into the image recognition model M, and acquires second intermediate information (second reference intermediate information) generated in the intermediate layer of the image recognition model M when the enhanced image EIr2 is inputted into the image recognition model M. The first feature image generator 116 generates the reference feature image DIr based on the first intermediate information and the second intermediate information.

<Production Phase>

Figure 11:
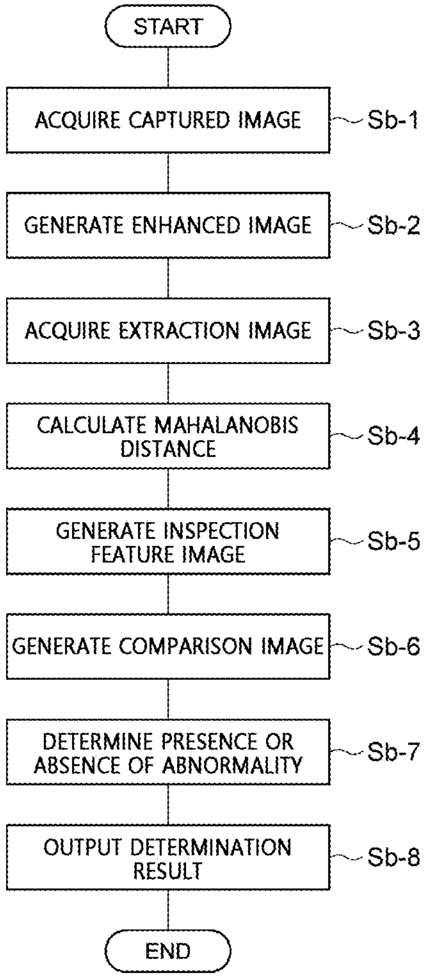
FIG. 11 is a flowchart illustrating an example of an inspection processing in a production phase.

FIG. 11 is a flowchart illustrating a series of processings in the production phase shown in FIG. 6. The series of processings shown in FIG. 11 are started in the state that an inspection target workpiece W, which is an inspection target with an unknown inspection result, is transferred to the inspection device U3 after being subjected to the processing before the inspection in the coating and developing processing.

The control device 100 first performs a process Sb-1. The process Sb-1 is performed under the same conditions as the process Sa-1 in the preparation phase. For example, in the process Sb-1, the second input image acquirer 122 of the inspection controller 110 images a surface Wa of the inspection target workpiece W by the inspection device U3 to thereby acquire a captured image PIs of the surface Wa of the inspection target workpiece W.

Then, the control device 100 performs a process Sb-2. The process Sb-2 is performed under the same conditions as the process Sa-2 in the preparation phase. For example, in the process Sb-2, the second input image acquirer 122 performs a contrast-enhancing processing on the captured image PIs obtained in the process Sb-1 to produce an enhanced image EIs.

Next, the control device 100 performs a process Sb-3. The process Sb-3 is performed under the same conditions as the process Sa-3 in the preparation phase. For example, in the process Sb-3, the second intermediate information acquirer 124 acquires inspection intermediate information generated in the intermediate layer of the image recognition model M when the enhanced image EIs (inspection input image) obtained in the process Sb-2 is inputted into the image recognition model M. For example, the second intermediate information acquirer 124 acquires, as the inspection intermediate information, an extraction image group CIGs including a plurality of extraction images CIs (multiple inspection extraction images) generated in the intermediate layer of the image recognition model M based on the enhanced image EIs and a plurality of filters that extract different features.

The plurality of filters used in generating the plurality of extraction images CIs are the same as the plurality of filters used in generating the plurality of extraction images CIr in the preparation phase. For example, if there is an arc-shaped flaw on the surface Wa of the inspection target workpiece W, an extraction image CI (feature map) in which a filter reacts to that arc-shaped flaw can be generated in the intermediate layer of the image recognition model M, like the 'extraction image CIj' shown in FIG. 8.

Subsequently, the control device 100 performs a process Sb-4. The process Sb-4 is performed in the same way as the process Sa-4 in the preparation phase. For example, in the process Sb-4, the second feature image generator 126 performs an operation for generating an inspection feature image DIs based on the plurality of extraction images CIs acquired in the process Sb-3. The second feature image generator 126 calculates, for the sequence data of pixel values (luminance values) of each pixel (i, j) included in the plurality of extraction images CIs, a Mahalanobis distance (inspection Mahalanobis distance) based on a data distribution of the plurality of extraction images CIs of any one extraction image group CIGr obtained in the preparation phase.

The same as in the process Sa-4 in the preparation phase, the second feature image generator 126 performs a processing of vertically arranging the pixel values included in each of the variables×1 to ×N corresponding to the N extraction images CIs. By using the averages and the covariance matrix obtained from the plurality of extraction images CIr in the process Sa-4, the second feature image generator 126 calculates the Mahalanobis distance for the sequence data in which the pixel values of the individual pixels (i, j) included in the N extraction images CIs are arranged horizontally. In this way, the calculation of the Mahalanobis distance in the present disclosure includes calculating the Mahalanobis distance by using the averages and the covariance matrix used when generating the reference data, rather than the averages and the covariance matrix obtained from the data from which the distance is to be calculated.

Then, the control device 100 performs a process Sb-5. For example, in the process Sb-5, the second feature image generator 126 generates the inspection feature image DIs based on the calculation result of the Mahalanobis distance in the process Sb-4. The second feature image generator 126 may set, for each pixel (i, j), the Mahalanobis distance calculated in the process Sb-4 as a pixel value of that pixel.

Thereafter, the control device 100 performs a process Sb-6. For example, in the process Sb-6, the abnormality determiner 136 generates a comparison image Dil by comparing the inspection feature image DIs generated in the process Sb-5 with the reference feature image DIr stored in the reference image storage 118. The abnormality determiner 136 may calculate, for each pixel (i, j), a difference between the pixel value of the inspection feature image DIs and the pixel value of the reference feature image DIr, thereby calculating a pixel value of each pixel (i, j) in the comparison image Dil.

Subsequently, the control device 100 performs a process Sb-7. For example, in the process Sb-7, the abnormality determiner 136 determines presence or absence of an abnormality on the surface Wa of the inspection target workpiece W based on the result (comparison image Dil generated in the process Sb-6) of comparing the inspection feature image DIs and the reference feature image DIr. The abnormality determiner 136 performs a processing of extracting a pixel having a pixel value equal to or larger than a set value in the inspection feature image DIs. The set value is set such that when there is a defect on the surface Wa of the workpiece W, a pixel value at that defective portion can be extracted.

When a region (or pixel) having a pixel value equal to or lager than the set value is detected in the comparison image Dil, the abnormality determiner 136 makes a determination that there exists an abnormality on the surface Wa of the inspection target workpiece W. On the other hand, if no region (or pixel) having a pixel value equal to or larger than the set value is detected in the comparison image Dil, the abnormality determiner 136 makes a determination that there is no abnormality on the surface Wa of the inspection target workpiece W.

Thereafter the control device 100 performs a process Sb-8. For example, in the process Sb-8, the determination result output module 138 outputs information indicating the determination result in the process Sb-7 to the processing controller 102 or the higher-level controller. When an abnormality signal indicating the presence of the abnormality is outputted to the processing controller 102 or higher-level controller, the workpiece W determined to have the abnormality (defect) on the surface Wa thereof may be excluded from a processing line after the inspection in the inspection device U3.

Effects of First Exemplary Embodiment

The substrate inspection method according to the first exemplary embodiment described above includes acquiring the reference input image based on the captured image of the surface Wa of the reference workpiece W; acquiring, when the reference input image is inputted into a neural network (image recognition model M) previously constructed to output a recognition result of an image inputted thereto, the reference intermediate information generated in the intermediate layer of the image recognition model M; and generating the reference feature image DIr representing features of the reference input image based on the reference intermediate information. The substrate inspection method further includes acquiring the inspection input image based on the captured image of the surface Wa of the inspection target workpiece W; acquiring the inspection intermediate information generated in the intermediate layer of the image recognition model M when the inspection input image is inputted into the image recognition model M; and generating the inspection feature image DIs representing features of the inspection input image based on the inspection intermediate information. The substrate inspection method further includes determining presence or absence of an abnormality on the surface Wa of the inspection target workpiece W based on the result of comparing the reference feature image DIr and the inspection feature image DIs.

In the intermediate layer of the image recognition model M, a processing of extracting a specific shape from the image inputted into the image recognition model M is performed. For this reason, the reference feature image DIr generated from the information generated in the intermediate layer of the image recognition model M can represent the features of the entire surface Wa of the reference workpiece W. Further, the inspection feature image DIs generated from the information generated in the intermediate layer of the image recognition model M can represent the features of the entire surface Wa of the inspection target workpiece W. By comparing the reference feature image DIr and the inspection feature image DIs, the features of the workpiece W itself can be removed, and then the feature of the abnormal portion can be detected. Therefore, the above-described substrate inspection method is advantageous in detecting an abnormality on the surface Wa of the workpiece W with high precision.

In the substrate inspection method described above, the reference intermediate information may be multiple reference extraction images (multiple extraction images CIr) generated in the intermediate layer of the image recognition model M based on the reference input image and multiple filters that extract different features. The generating of the reference feature image DIr may include generating the reference feature image DIr based on the multiple extraction images CIr. The inspection intermediate information may be multiple inspection extraction images (multiple extraction images CIs) generated in the intermediate layer of the image recognition model M based on the inspection input image and the multiple filters. The generating of the inspection feature image DIs may include generating the inspection feature image DIs based on the multiple extraction images CIs. In this case, various specific shapes are extracted by the multiple filters in the intermediate layer of the image recognition model M. By extracting these various specific shapes, if an abnormal portion is included in the surface Wa of the workpiece W, the abnormal portion may react to the filter and thus can be extracted. Therefore, this substrate inspection method is useful for high-precision abnormality detection on the surface Wa of the workpiece W.

In the above-described substrate inspection method, the generating of the reference feature image DIr may include calculating, for the sequence data of the pixel value of each pixel (i, j) included in the multiple extraction images CIr, the pixel value of each pixel of the reference feature image DIr based on the result of calculating the reference Mahalanobis distance on the basis of the data distribution of the multiple extraction images CIr. The generating of the inspection feature image DIs may include calculating, for the sequence data of the pixel value of each pixel (i, j) included in the multiple extraction images CIs, the pixel value of each pixel of the inspection feature image DIs based on the result of calculating the inspection Mahalanobis distance based on the average and the covariance matrix used when calculating the reference Mahalanobis distance. The Mahalanobis distance may represent the degree of deviation (abnormality) from the data distribution. For this reason, if an abnormal portion exists on the surface Wa, a pixel value of a specific pixel changes in response to the filter in the image recognition model M. As a result, the Mahalanobis distance at that specific pixel may become a large value. In the above-described configuration, since the feature images are compared with each other, a region where the Mahalanobis distance increases due to the features of the workpiece W itself can be removed, and a region where the Mahalanobis distance increases due to the abnormal portion can be then detected. Therefore, this substrate inspection method is more useful for high-precision abnormality detection on the surface Wa of the workpiece W.

In the above-described substrate inspection method, the reference input image may be the enhanced image EIr generated by performing the contrast-enhancing processing on the captured image PIr of the surface Wa of the reference workpiece W. The inspection input image may be the enhanced image EIs generated by performing the contrast-enhancing processing on a captured image PIs of the surface Wa of the inspection target workpiece W. In this case, a location corresponding to the abnormal portion can be enhanced, and the inspection feature image Dis reflecting this feature can be acquired. For example, even if a portion other than the abnormal portion is enhanced as a noise, the noise can be reduced by comparing the feature images. Therefore, the substrate inspection method is more useful for high-precision abnormality detection on the surface Wa of the workpiece W.

The substrate inspection method described above may include acquiring the second reference input image based on a captured image of a surface Wa of another reference workpiece W; and acquiring the second reference intermediate information generated in the intermediate layer of the image recognition model M when the second reference input image is inputted into the image recognition model M. The generating of the reference feature image Dir may include generating the reference feature image Dir based on the reference intermediate information and the second reference intermediate information. In this case, one reference feature image Dir is generated from the captured images of the surfaces Wa of the multiple reference workpiece W. For this reason, the reference feature image Dir can be generated after an influence of the features of the one reference workpiece W is reduced. Therefore, the substrate inspection method is more useful for high-precision abnormality detection on the surface Wa of the workpiece W.

Second Exemplary Embodiment

Now, the substrate processing system 1 according to a second exemplary embodiment will be explained with reference to FIG. 12 to FIG. 16. In the substrate processing system 1 according to the second exemplary embodiment, a series of processings performed by the inspection controller 110 are different from the series of processings performed by the inspection controller 110 according to the first exemplary embodiment. The coating and developing apparatus 2 may perform a coating and developing processing (substrate processing) on a lot basis for a preset number of workpieces W. The coating and developing apparatus 2 performs the coating and developing processing on the preset number of workpieces W sequentially in a processing on a lot basis (lot processing). The preset number of sheets representing the unit of the lot may be determined based on the number of workpieces W that can be accommodated in the carrier C. The coating and developing apparatus 2 repeatedly performs the coating and developing processing on the lot basis.

Unlike in the inspection method of the first exemplary embodiment, the inspection controller 110 generates a reference feature image, which is reference data to be used in an inspection, during the production phase. The inspection controller 110 generates the reference feature image by using a workpiece W (first substrate) to be first processed in the lot-basis coating and developing processing. In this case, the workpiece W to be processed first becomes a reference workpiece W, although it is unknown whether there is an abnormality on a surface Wa of this workpiece W. By using the reference feature image, the inspection controller 110 performs the inspection on a workpiece W (second substrate) to be processed second or onward as an inspection target workpiece W in the lot-basis coating and developing processing.

Figure 12:
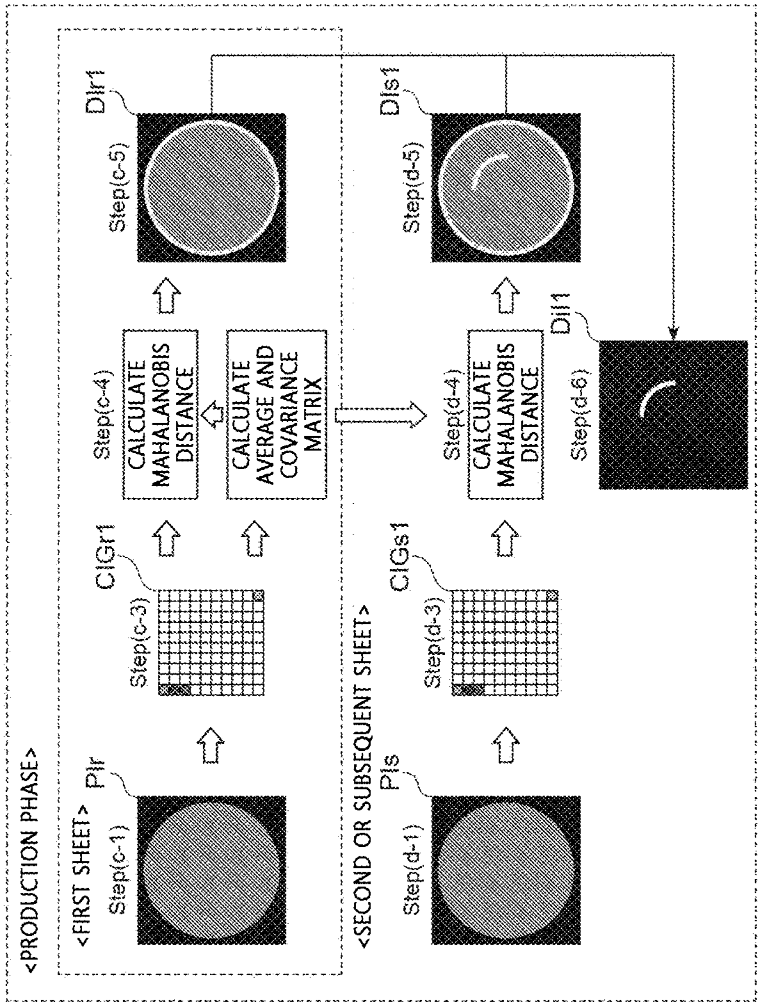
FIG. 12 is a schematic diagram illustrating an example of a substrate inspection method according to a second exemplary embodiment.
Figure 13:
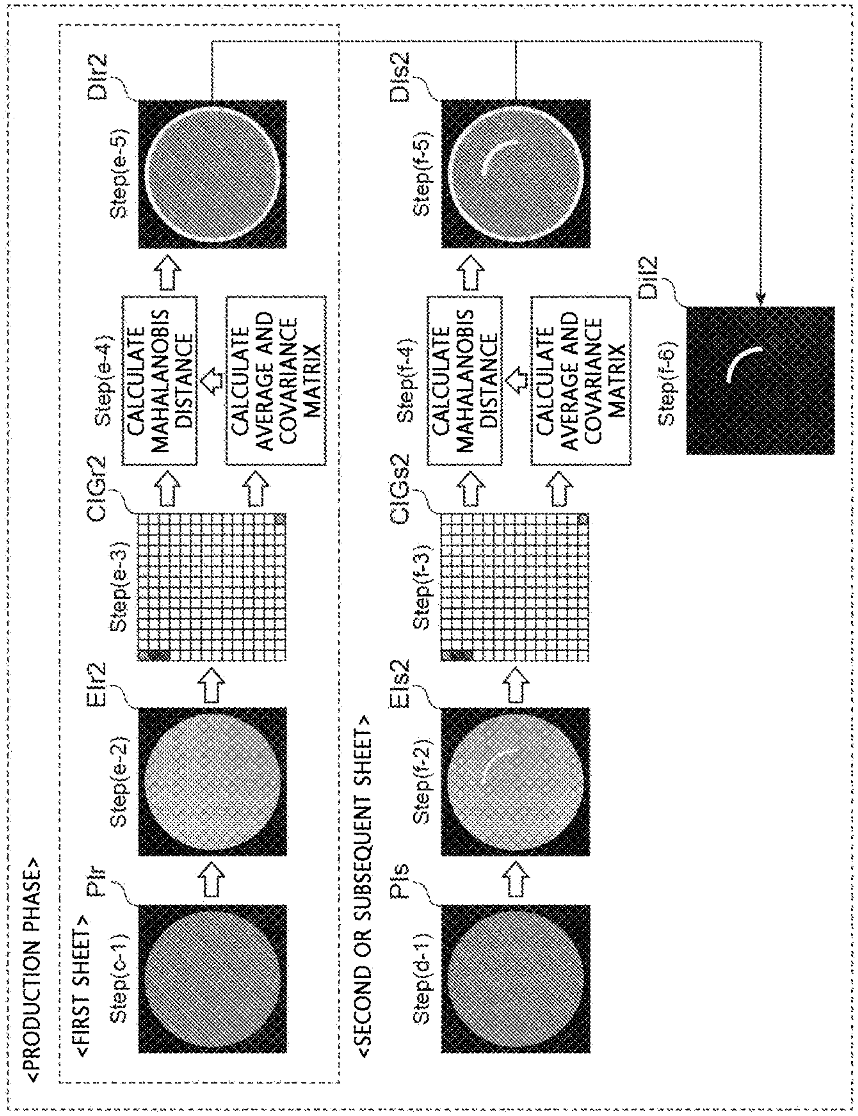
FIG. 13 is a schematic diagram illustrating an example of the substrate inspection method according to the second exemplary embodiment.
Figure 14:
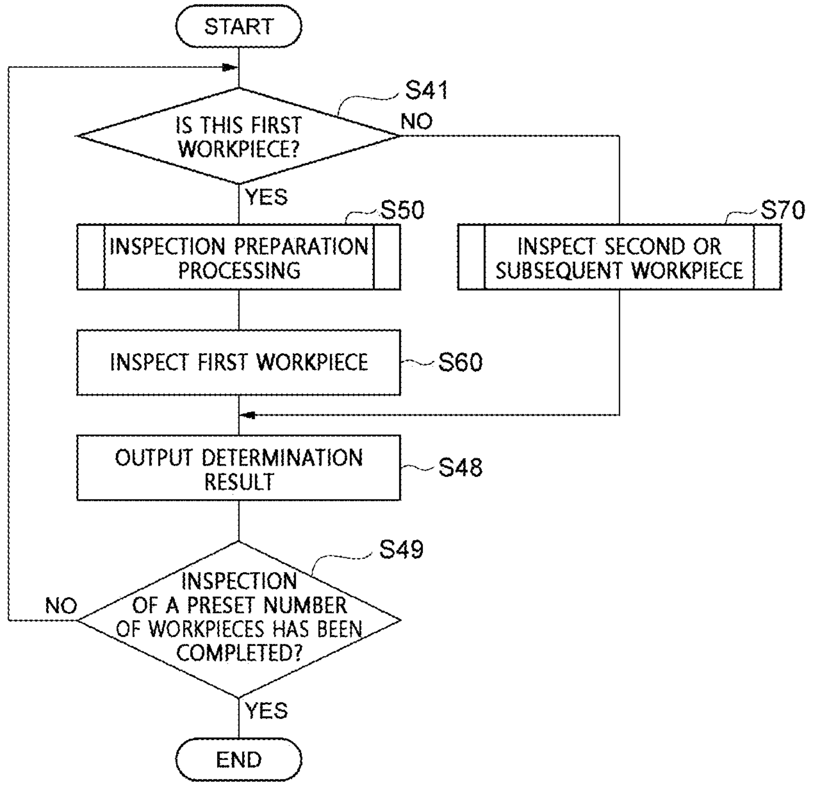
FIG. 14 is a flowchart illustrating an example of a series of processings performed in the substrate inspection method.

Unlike in the inspection method of the first exemplary embodiment, the inspection controller 110 performs two different inspection procedures, and then determines presence or absence of an abnormality on the surface Wa of the workpiece W from results obtained from the different inspection procedures. FIG. 12 shows a series of processings performed in one inspection procedure, and FIG. 13 shows a series of processings performed in the other inspection procedure. In any of these inspection procedures, a reference feature image is generated from the first workpiece W. FIG. 14 is a flowchart illustrating an example of a series of processings performed on a lot basis by the inspection controller 110.

In these series of processings, in the state that a workpiece W as a processing target is transferred into the inspection device U3 after being subjected to a processing before an inspection in the coating and developing processing, the control device 100 performs a process S41. For example, in the process S41, the inspection controller 110 determines whether the workpiece W as the processing target transferred into the inspection device U3 is the first workpiece W in the lot-basis processing. The inspection controller 110 may determine whether it is the first workpiece W in the lot unit by counting the number of the workpieces W inspected in the inspection device U3 from the beginning of the production phase.

Figure 15:
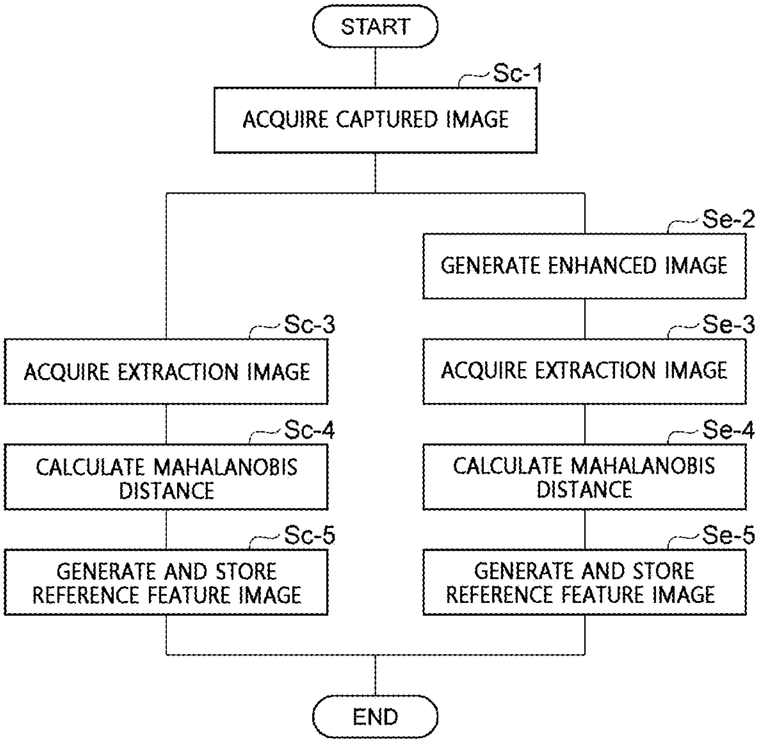
FIG. 15 is a flowchart illustrating an example of an inspection preparation processing.

In the process S41, if the workpiece Was the processing target transferred into the inspection device U3 is the first workpiece W (process S41: YES), the processing performed by the control device 100 proceeds to a process S50. For example, in the process S50, the inspection controller 110 performs an inspection preparation processing to perform an inspection of a second or subsequent workpiece W to be processed. FIG. 15 is a flowchart illustrating an example of the inspection preparation processing in the process S50. The inspection preparation processing of the process S50 includes the series of processings on the first sheet shown in FIG. 12 and the series of processings on the first sheet shown in FIG. 13.

In the inspection preparation processing of the process S50, the control device 100 first performs a process Sc-1. The process Sc-1 is performed in the same way as the process Sa-1 in the substrate inspection method according to the first exemplary embodiment. For example, in the process Sc-1, the first input image acquirer 112 of the inspection controller 110 images the surface Wa of the first workpiece W by the inspection device U3, thus acquiring a captured image PIr of the surface Wa of the first workpiece W.

Then, the control device 100 performs a process SC-3. The process Sc-3 is performed in the same way as the process Sa-3 in the substrate inspection method according to the first exemplary embodiment. For example, in the process Sc-3, the first intermediate information acquirer 114 acquires reference intermediate information generated in the intermediate layer of the image recognition model M when the captured image PIr (reference input image) obtained in the process Sc-1 is inputted into the image recognition model M. The first intermediate information acquirer 114 acquires, as the reference intermediate information, an extraction image group CIGr1 including a plurality of extraction images CIr1 (multiple reference extraction images) generated in the intermediate layer of the image recognition model M based on the captured image PIr and a plurality of filters that extract different features. The number of the plurality of extraction images CIr1 included in the extraction image group CIGr1 may be 30 to 60.

Next, the control device 100 performs a process SC-4. The process Sc-4 is performed in the same way as the process Sa-4 in the substrate inspection method according to the first exemplary embodiment. For example, in the process Sc-4, the first feature image generator 116 calculates a Mahalanobis distance (reference Mahalanobis distance) based on a data distribution of the plurality of extraction images CIr1 for sequence data of a pixel value (luminance value) of each pixel (i, j) included in the plurality of extraction images CIr1.

Then, the control device 100 performs a process Sc-5. The process Sc-5 is performed in the same way as the process Sa-5 or the process Sb-5 in the substrate inspection method according to the first exemplary embodiment. For example, in the process Sc-5, the first feature image generator 116 generates a reference feature image DIr1 based on the calculation result of the Mahalanobis distance in the process Sc-4. The first feature image generator 116 may set, for each pixel (i, j), the Mahalanobis distance calculated in the process Sc-4 as a pixel value of that pixel in the reference feature image DIr1. The reference image storage 118 stores therein the reference feature image DIr1.

In parallel with or after the series of processings including the processes Sc-3, Sc-4, and Sc-5, the control device 100 performs a process Se-2. The process Se-2 is performed in the same way as the process Sa-2 in the substrate inspection method according to the first exemplary embodiment. For example, in the process Se-2, the first input image acquirer 112 performs a contrast-enhancing processing on the captured image PIr obtained in the process Sc-1 to thereby generate an enhanced image EIr2.

Thereafter, the control device 100 performs a process Se-3. The process Se-3 is performed in the same way as the process Sc-3. For example, in the process Se-3, the first intermediate information acquirer 114 acquires reference intermediate information generated in the intermediate layer of the image recognition model M when the enhanced image EIr2 (reference input image) obtained in the process Se-2 is inputted into the image recognition model M. The first intermediate information acquirer 114 acquires, as the reference intermediate information, an extraction image group CIGr2 including a plurality of extraction images CIr2 (multiple second reference extraction images) generated in the intermediate layer of the image recognition model M based on the enhanced image EIr2 and a plurality of filters (multiple second filters) that extract different images. The number of the plurality of extraction images CIr2 included in the extraction image group CIGr2 may be different from the number of the plurality of extraction images CIr1 included in the extraction image group CIGr1 obtained in the process Sc-3, or may be 180 to 220. In other words, the number of the filters for generating the extraction image group may be different between the process Sc-3 and the process Se-3.

Next, the control device 100 performs a process Se-4. The process Se-4 is performed in the same way as the process Sc-4. For example, in the process Se-4, the first feature image generator 116 calculates, for sequence data of a pixel value (luminance value) of each pixel (i, j) included in the plurality of extraction images CIr1, a Mahalanobis distance (reference Mahalanobis distance) based on a data distribution of the plurality of extraction images CIr1.

Thereafter, the control device 100 performs a process Se-5. The process Se-5 is performed in the same way as the process Sc-5. For example, in the process Se-5, the first feature image generator 116 generates a reference feature image DIr2 (second reference feature image) based on the calculation result of the Mahalanobis distance in the process Se-4. The first feature image generator 116 may set, for each pixel (i, j), the Mahalanobis distance calculated in the process Se-4 as a pixel value of that pixel in the reference feature image DIr2. The reference image storage 118 stores therein the reference feature image DIr2.

Through the above-described operations, the inspection preparation processing of the process S50 is completed, and the reference feature image DIr1 and the reference feature images DIr2, which are reference data to be used in the inspection of the second or subsequent workpieces W, are generated.

Upon the completion of the process S50, the control device 100 performs a process S60, as shown in FIG. 14. For example, in the process S60, the abnormality determiner 136 determines whether there is an abnormality on the surface Wa of the first workpiece W based on at least one of the reference feature image DIr1 and the reference feature image DIr2 (for example, the reference feature image DIr2). The abnormality determiner 136 performs a processing of extracting a pixel having a pixel value equal to or larger than a set value in the reference feature image DIr2, and if a region (or a pixel) having a pixel value equal to or larger than the set value is detected, the abnormality determiner 136 may make a determination that there is an abnormality (defect) on the surface Wa. In the process S60, although sensitivity is low, it may be possible to detect an abnormality on the surface Wa of the first workpiece W.

Figure 16:
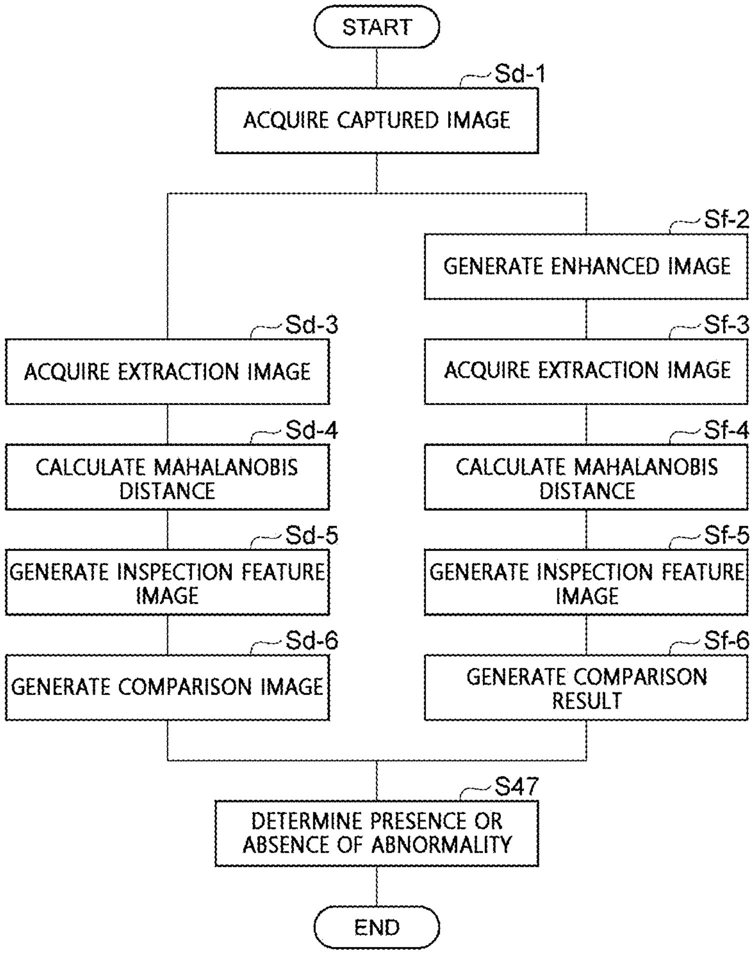
FIG. 16 is a flowchart illustrating an example of an inspection processing for a workpiece.

Meanwhile, in a process S41, if the workpiece W which is the processing target transferred to the inspection device U3 is the second or subsequent workpiece W (process S41: NO), the processing performed by the control device 100 proceeds to a process S70. For example, in the process S70, the inspection controller 110 performs an inspection on the workpiece W, which is the second or subsequent workpiece W to be processed. FIG. 16 is a flowchart illustrating an example of the inspection processing of the process S70. The inspection processing of the process S70 includes the series of processings shown in FIG. 12 for the second or subsequent sheet and the series of processings shown in FIG. 13 for the second or subsequent sheet.

In the inspection processing of the process S70, the control device 100 first performs a process Sd-1. The process Sd-1 is performed under the same conditions as the process Sc-1. For example, in the process Sd-1, the second input image acquirer 122 of the inspection controller 110 images the surface Wa of the second or subsequent inspection target workpiece W to be processed by the inspection device U3 to thereby acquire a captured image PIs of the inspection target workpiece W.

Then, the control device 100 performs a process Sd-3. The process Sd-3 is performed under the same conditions as the process Sc-3. For example, in the process Sd-3, the second intermediate information acquirer 124 acquires inspection intermediate information generated in the intermediate layer of the image recognition model M when the captured image PIs (reference input image) obtained in the process Sd-1 is inputted into the image recognition model M. The second intermediate information acquirer 124 acquires, as the inspection intermediate information, an extraction image group CIGs1 including a plurality of extraction images CIs1 (multiple inspection extraction images) generated in the intermediate layer of the image recognition model M based on the captured image PIs and a plurality of filters that extract different features. The plurality of filters used in the process Sd-3 and the plurality of filters used in the process Sc-3 are the same.

Subsequently, the control device 100 performs a process Sd-4. The process Sd-4 is performed in the same way as the process Sb-4 in the substrate inspection method according to the first exemplary embodiment. For example, in the process Sd-4, the second feature image generator 126 calculates, for sequence data of a pixel value (luminance value) of each pixel (i, j) included in the plurality of extraction images CIs1 obtained in the process Sd-3, a Mahalanobis distance (inspection Mahalanobis distance) based on a data distribution of the plurality of extraction images CIr1 obtained in the process Sc-3.

Next, the control device 100 performs a process Sd-5. The process Sd-5 is performed in the same way as the process Sc-5. For example, in the process Sd-5, the second feature image generator 126 generates an inspection feature image DIs1 based on the calculation result of the Mahalanobis distance in the process Sd-4. The second feature image generator 126 may set, for each pixel (i, j), the Mahalanobis distance calculated in the process Sd-4 as a pixel value of that pixel in the inspection feature image DIs1.

Thereafter, the control device 100 performs a process Sd-6. The process Sd-6 is performed in the same way as the process Sb-6 in the substrate inspection method according to the first exemplary embodiment. For example, in the process Sd-6, the abnormality determiner 136 compares the inspection feature image DIs1 generated in the process Sd-5 with the reference feature image DIr1 stored in the reference image storage 118, thus generating a comparison image DiI1. The abnormality determiner 136 may calculate, for each pixel (i, j), a difference between a pixel value of the inspection feature image DIs1 and a pixel value of the reference feature image DIr1 to calculate a pixel value of the corresponding pixel of the comparison image DiI1.

In parallel with or after the series of processings including the processes Sd-3 to Sd-6, the control device 100 performs a process Sf-2. The process Sf-2 is performed under the same conditions as the process Se-2. For example, in the process Sf-2, the second input image acquirer 122 performs a contrast-enhancing processing on the captured image PIs obtained in the process Sd-1 to thereby generate an enhanced image EIs2.

The, the control device 100 performs a process Sf-3. The process Sf-3 is performed under the same conditions as the process Se-3. For example, in the process Sf-3, the second intermediate information acquirer 124 acquires inspection intermediate information generated in the intermediate layer of the image recognition model M when the enhanced image EIs2 (inspection input image) obtained in the process Sf-2 is inputted into the image recognition model M. The second intermediate information acquirer 124 acquires, as the inspection intermediate information, an extraction image group CIGs2 including a plurality of extraction images CIs2 (multiple second inspection extraction images) generated in the intermediate layer of the image recognition model M based on the enhanced image EIs2 and a plurality of filters (multiple second filters) that extract different features. The plurality of filters used in the process Se-3 and the plurality of filters used in the process Sf-3 are the same.

Subsequently, the control device 100 performs a process Sf-4. The process Sf-4 is performed in the same way as the process Se-4. For example, in the process Sf-4, the second feature image generator 126 calculates, for sequence data of a pixel value (luminance value) of each pixel (i, j) included in the plurality of extraction images CIs2 obtained in the process Sf-3, a Mahalanobis distance (inspection Mahalanobis distance) based on a data distribution of the plurality of extraction images CIs2. As compared to the process Sd-4 in which the averages and the covariance matrix used to calculate the Mahalanobis distance are used to generate reference data, averages and a covariance matrix obtained from the plurality of extraction images CIs2 themselves are used in the process Sf-4.

Next, the control device 100 performs a process Sf-5. The process Sf-5 is performed in the same way as the process Se-5. For example, in the process Sf-5, the second feature image generator 126 generates an inspection feature image DIs2 (second inspection feature image) based on the calculation result of the Mahalanobis distance in the process Sf-4. The second feature image generator 126 may set, for each pixel (i, j), the Mahalanobis distance calculated in the process Sf-4 as a pixel value of that pixel in the inspection feature image DIs2.

Thereafter, the control device 100 performs a process Sf-6. The process Sf-6 is performed in the same way as the process Sd-6. For example, in the process Sf-6, the abnormality determiner 136 compares the inspection feature image DIs2 generated in the process Sf-5 with the reference feature image DIr2 stored in the reference image storage 118, thereby generating a comparison image DiI2. The abnormality determiner 136 may calculate, for each pixel (i, j), a difference between a pixel value of the inspection feature image DIs2 and a pixel value of the reference feature image DIr2 to calculate a pixel value of the corresponding pixel of the comparison image Dil2.

Then, the control device 100 performs a process S47. For example, in the process S47, the abnormality determiner 136 determines whether there is an abnormality on the surface Wa of the workpiece W as the processing target based on the result of comparing the reference feature image DIr1 and the inspection feature image DIs1 and the result of comparing the reference feature image DIr2 and the inspection feature image DIs2. The abnormality determiner 136 determines presence or absence of an abnormality on the surface Wa of the workpiece W as the processing target based on the comparison image Dil1 obtained in the process Sd-6 and the comparison image Dil2 obtained in the process Sf-6.

As one example, the abnormality determiner 136 performs a processing of extracting a pixel having a pixel value equal to or larger than a set value in each of the comparison image Dil1 and the comparison image Dil2. If a region (or a pixel) having a pixel value equal to or larger than the set value is detected in at least one of the comparison image Dil1 and the comparison image Dil2, the abnormality determiner 136 may make a determination that there is an abnormality on the surface Wa of the workpiece W as an inspection target. Meanwhile, if a region (or a pixel) having a pixel value equal to or larger than the set value is not detected in both of the comparison image Dil1 and the comparison image Dil2, the abnormality determiner 136 may make a determination that there is no abnormality on the surface Wa of the inspection target workpiece W.

Referring back to FIG. 14, upon the completion of the process S60 or the process S70, the control device 100 performs a process S48. For example, in the process S48, the determination result output module 138 outputs information indicating the determination results in the process S47 and the process S60 to the processing controller 102 or the higher-level controller. The workpiece W determined to have an abnormality (defect) on the surface Wa thereof may be excluded from a processing line after the inspection in the inspection device U3. If an abnormality is detected in the first workpiece W in the process S60, the inspection controller 110 may perform the process S50 on the second workpiece W to generate reference data from a captured image of the second workpiece W.

Next, the controller 100 performs a process S49. For example, in the process S49, the control device 100 determines whether inspection of a set number of workpieces W defining a lot unit has been completed. If it is determined in the process S49 that the inspection of the set number of workpieces W has not been completed yet (process S49: NO), the processing performed by the control device 100 returns to the process S41. If, on the other hand, it is determined in the process S49 that the inspection of the set number of workpieces W has been completed (process S49: YES), the substrate inspection for one lot is completed. The control device 100 (inspection controller 110) performs the same substrate inspection processing for the next lot.

Effects of Second Exemplary Embodiment

In the substrate inspection method performed in the substrate processing system 1 according to the second exemplary embodiment, the same effects as in the first exemplary embodiment are obtained. Thus, the substrate inspection method according to the second exemplary embodiment is advantageous when it is applied to precisely detecting an abnormality on the surface Wa of the workpiece W.

In the substrate inspection method according to the second exemplary embodiment described above, the generating of the reference feature image DIr2 may include calculating, for the sequence data of the pixel value of each pixel included in the multiple reference extraction images (the multiple extraction images CIr2), the pixel value of each pixel of the reference feature image DIr2 based on the calculation result of the reference Mahalanobis distance on the basis of the data distribution of the multiple extraction images CIr2. The generating of the inspection feature image DIs2 may include calculating, for the sequence data of the pixel value of each pixel included in the multiple inspection extraction images (the multiple extraction images CIs2), the pixel value of each pixel of the inspection feature image DIs2 based on the calculation result of the inspection Mahalanobis distance on the basis of the data distribution of the multiple extraction images CIs2. When calculating the inspection Mahalanobis distance by using the average and the covariance matrix used when calculating the reference Mahalanobis distance to create the reference data, even a change between the reference workpiece W and the inspection target workpiece W that is not intended to be determined as an abnormality may be detected. In the above-described configuration, since the inspection Mahalanobis distance is calculated from its own data distribution, the difference from the reference workpiece W is not reflected in the inspection Mahalanobis distance. Therefore, the substrate inspection method according to the second exemplary embodiment is useful for adjusting detection sensitivity according to the type of an anomality supposed to be detected.

In the substrate inspection method according to the second exemplary embodiment described above, the reference workpiece W may be a first workpiece W on which the coating and developing processing is performed first in the Iot processing in which the preset coating and developing processing is performed in sequence on a set number of workpieces W to be processed. The inspection target workpiece W may be a second workpiece W on which the coating and developing processing is performed in an order of second or later in the Iot processing. In this case, the reference data for inspection is generated on the lot basis. For this reason, it is difficult for the abnormality detection to be affected by non-uniformity of the workpieces W themselves or non-uniformity in the coating and developing processing between the lots. The substrate inspection method is useful for high-precision abnormality detection on the surface Wa of the workpiece W.

The substrate inspection method according to the second exemplary embodiment described above includes, in addition to the generating of the reference feature image DIr1 and the generating of the inspection feature images DIs1, acquiring, when the reference input image is inputted into the image recognition model M, the multiple second reference extraction images (the multiple extraction images CIr2) generated in the intermediate layer of the image recognition model M based on the reference input image and the multiple second filters that extract different features; and generating the second reference feature image (the reference feature image DIr2) based on the multiple extraction images CIr2. The substrate inspection method may further include acquiring, when the inspection input image is inputted into the image recognition model M, the multiple second inspection extraction images (the multiple extraction images CIs2) generated in the intermediate layer of the image recognition model M based on the inspection input image and the multiple second filters; and generating the second inspection feature image (the inspection feature image DIs2) based on the multiple extraction images CIs2. The determining of the presence or absence of the abnormality on the surface Wa of the inspection target workpiece W may include determining presence or absence of an abnormality on the surface Wa of the inspection target workpiece W based on the result of comparing the reference feature image DIr1 and the inspection feature image DIs1 and the result of comparing the reference feature image DIr2 and the inspection feature image DIs2. In this case, since the features images are compared in each of the two different inspection procedures, it is possible to reduce a possibility that the abnormality will not be detected while facilitating the adjustment of the detection sensitivity according to the type of the abnormality to be detected. Therefore, this substrate inspection method is advantageous to carry out the adjustment of the detection sensitivity for the abnormality while achieving detection precision.

The substrate inspection method according to the second exemplary embodiment described above may further include determining presence or absence of an abnormality on the surface Wa of the first workpiece W based on the reference feature image. In this case, if an obvious abnormality exists on the surface Wa of the first workpiece W for generating the reference data for the inspection, this workpiece W can be excluded, and the reference data can be created by using another workpiece W. Therefore, the substrate inspection method according to the second exemplary embodiment is useful for high-precision abnormality detection on the surface Wa of the workpiece W.

Modification Examples

The present disclosure is not limited to the first exemplary embodiment and the second exemplary embodiment described above. Some of the subject matters described in the first exemplary embodiment may be applied to the second exemplary embodiment, and some of the subject matters described in the second exemplary embodiment may be applied to the first exemplary embodiment. The above-described series of processings can be modified appropriately. In the series of processings, the control device 100 (inspection controller 110) may perform one process and the next process in parallel, or may perform the respective processes in an order different from the above-described example. The control device 100 (inspection controller 110) may omit any one process, or may perform a processing different from the above-described example in any one process.

The inspection controller 110 according to the first exemplary embodiment may omit processes Sa-2 and Sb-2. In this case, the inspection controller 110 inputs the captured image PIr into the image recognition model M in the process Sa-3, and inputs the captured image PIs into the image recognition model M in the process Sb-3. The inspection controller 110 according to the first exemplary embodiment may generate reference feature image DIr, which is the reference data, from one sheet of reference workpiece W.

Although the inspection controller 110 according to the second exemplary embodiment executes the two different inspection procedures, only one may be executed. The inspection controller 110 may determine presence or absence of an abnormality on the surface Wa of the inspection target workpiece W based on the comparison image DiI1 obtained by executing the inspection procedure shown in FIG. 12 without executing the inspection procedure shown in FIG. 13. The inspection controller 110 may determine whether there is an abnormality on the surface Wa of the inspection target workpiece W based on the comparison image DiI2 obtained by executing the inspection procedure shown in FIG. 13 without executing the inspection procedure shown in FIG. 12.

In the inspection procedure according to the second exemplary embodiment, the series of processings performed on the first workpiece W may be carried out in the preparation phase before the start of the production phase. In addition, in the production phase, the series of processings performed on the second and subsequent workpieces W may be carried out on the workpieces W to be processed, regardless of the lot unit.

The inspection controller 110 may not store therein the image recognition model M, but an external device of the control device 100 may store therein the image recognition model M. In this case, the inspection controller 110 may transmit a captured image or an enhanced image to the external device and then acquire the extraction image group CIG from the external device.

A computer constituting the inspection controller 110 may be provided at a place other than the coating and developing apparatus 2. In this case, the control device 100 and the inspection controller 110 may be connected to communicate with each other in a wired or wireless manner, or via a network. The control device 100 may acquire a captured image from the inspection device U3 and then transmit the captured image to the inspection controller 110. The inspection controller 110 may transmit information indicating a determination result regarding presence or absence of an abnormality to the control device 100. In one of the various examples described above, at least some of the matters described in the other example may be applied.

According to the exemplary embodiment, it is possible to provide the substrate inspection method, the recording medium, and the substrate inspection device useful for detecting the abnormality on the substrate surface with high precision.

We claim:

1. A substrate inspection method, comprising:

acquiring a reference input image based on a captured image of a surface of a reference substrate;

acquiring, when the reference input image is inputted into a neural network previously constructed to output a recognition result of an image inputted thereto, reference intermediate information generated in an intermediate layer of the neural network;

generating a reference feature image representing a feature of the reference input image based on the reference intermediate information;

acquiring an inspection input image based on a captured image of a surface of an inspection target substrate;

acquiring inspection intermediate information generated in the intermediate layer of the neural network when the inspection input image is inputted into the neural network;

generating an inspection feature image representing a feature of the inspection input image based on the inspection intermediate information; and determining presence or absence of an abnormality on the surface of the inspection target substrate based on a result of comparing the reference feature image and the inspection feature image.

2. The substrate inspection method of claim 1, wherein the reference intermediate information is multiple reference extraction images generated in the intermediate layer of the neural network based on the reference input image and multiple filters configured to extract different features, the generating of the reference feature image comprises generating the reference feature image based on the multiple reference extraction images, the inspection intermediate information is multiple inspection extraction images generated in the intermediate layer of the neural network based on the inspection input image and the multiple filters, and the generating of the inspection feature image comprises generating the inspection feature image based on the multiple inspection extraction images.

3. The substrate inspection method of claim 2, wherein the generating of the reference feature image comprises calculating, for sequence data of a pixel value of each pixel included in the multiple reference extraction images, a pixel value of each pixel of the reference feature image based on a result of calculating a reference Mahalanobis distance on the basis of a data distribution of the multiple reference extraction images, and the generating of the inspection feature image comprises calculating, for sequence data of a pixel value of each pixel included in the multiple inspection extraction images, a pixel value of each pixel of the inspection feature image based on a result of calculating an inspection Mahalanobis distance on the basis of an average and a covariance matrix used when calculating the reference Mahalanobis distance.

4. The substrate inspection method of claim 2, wherein the generating of the reference feature image comprises calculating, for sequence data of a pixel value of each pixel included in the multiple reference extraction images, a pixel value of each pixel of the reference feature image based on a result of calculating a reference Mahalanobis distance on the basis of a data distribution of the multiple reference extraction images, and the generating of the inspection feature image comprises calculating, for sequence data of a pixel value of each pixel included in the multiple inspection extraction images, a pixel value of each pixel of the inspection feature image based on a result of calculating an inspection Mahalanobis distance on the basis of a data distribution of the multiple inspection extraction images.

5. The substrate inspection method of claim 1, wherein the reference input image is an image generated by performing a contrast-enhancing processing on the captured image of the surface of the reference substrate, and the inspection input image is an image generated by performing a contrast-enhancing processing on the captured image of the surface of the inspection target substrate.

6. The substrate inspection method of claim 1, further comprising:

acquiring a second reference input image based on a captured image of a surface of a second reference substrate; and acquiring second reference intermediate information generated in the intermediate layer of the neural network when the second reference input image is inputted into the neural network, wherein the generating of the reference feature image comprises generating the reference feature image based on the reference intermediate information and the second reference intermediate information.

7. The substrate inspection method of claim 1, wherein the reference substrate is a first substrate on which a substrate processing is performed first in a lot processing in which the substrate processing is performed in sequence on a set number of substrates to be processed, and the inspection target substrate is a second substrate on which the substrate processing is performed in an order of second or later in the lot processing.

8. The substrate inspection method of claim 2, wherein the reference substrate is a first substrate on which a substrate processing is performed first in a lot processing in which the substrate processing is performed in sequence on a set number of substrates to be processed, the inspection target substrate is a second substrate on which the substrate processing is performed in an order of second or later in the lot processing, and the substrate inspection method further comprises:

acquiring, when the reference input image is inputted into the neural network, multiple second reference extraction images generated in the intermediate layer of the neural network based on the reference input image and multiple second filters configured to extract different features;

generating a second reference feature image based on the multiple second reference extraction images;

acquiring, when the inspection input image is inputted into the neural network, multiple second inspection extraction images generated in the intermediate layer of the neural network based on the inspection input image and the multiple second filters; and generating a second inspection feature image based on the multiple second inspection extraction images, wherein the determining of the presence or absence of the abnormality on the surface of the inspection target substrate comprises determining presence or absence of an abnormality on a surface of the second substrate based on a result of comparing the reference feature image and the inspection feature image and a result of comparing the second reference feature image and the second inspection feature image.

9. The substrate inspection method of claim 7, further comprising:

determining presence or absence of an abnormality on a surface of the first substrate based on the reference feature image.

10. The substrate inspection method of claim 8, further comprising:

determining presence or absence of an abnormality on a surface of the first substrate based on the reference feature image.

11. A non-transitory computer-readable recording medium having stored thereon a substrate inspection program that, in response to execution, cause a substrate inspection method as claimed in claim 1 to be performed on a computer.

12. A substrate inspection device, comprising:

a first input image acquirer configured to acquire a reference input image based on a captured image of a surface of a reference substrate;

a first intermediate information acquirer configured to acquire, when the reference input image is inputted into a neural network previously constructed to output a recognition result of an image inputted thereto, reference intermediate information generated in an intermediate layer of the neural network;

a first feature image generator configured to generate a reference feature image representing a feature of the reference input image based on the reference intermediate information;

a second input image acquirer configured to acquire an inspection input image based on a captured image of a surface of an inspection target substrate;

a second intermediate information acquirer configured to acquire inspection intermediate information generated in the intermediate layer of the neural network when the inspection input image is inputted into the neural network;

a second feature image generator configured to generate an inspection feature image representing a feature of the inspection input image based on the inspection intermediate information; and an abnormality determiner configured to determine presence or absence of an abnormality on the surface of the inspection target substrate based on a result of comparing the reference feature image and the inspection feature image.

* * * * *